(12) United States Patent
Maeda

(10) Patent No.: US 7,595,812 B2
(45) Date of Patent: Sep. 29, 2009

(54) IMAGE FORMING APPARATUS, PRINTER APPARATUS, FACSIMILE APPARATUS, AND COPYING MACHINE

(75) Inventor: Katsuhiko Maeda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 248 days.

(21) Appl. No.: 11/337,616

(22) Filed: Jan. 24, 2006

(65) Prior Publication Data

US 2006/0164505 A1 Jul. 27, 2006

(30) Foreign Application Priority Data

Jan. 25, 2005 (JP) ............... 2005-017402

(51) Int. Cl.
 B41J 2/47 (2006.01)
 B41J 2/385 (2006.01)
 B41J 2/435 (2006.01)

(52) U.S. Cl. ............ 347/234; 347/235; 347/116; 347/248; 347/249; 347/250; 347/236; 347/237; 347/129; 347/225; 347/251

(58) Field of Classification Search ......... 347/234, 347/251, 235, 246, 248, 249, 250, 236, 116, 347/129, 247, 237, 225
See application file for complete search history.

(56) References Cited

U.S. PATENT DOCUMENTS

| 5,838,479 | A * | 11/1998 | Shiraishi ............ 359/204.1 |
| 6,831,672 | B2 | 12/2004 | Maeda |
| 6,833,856 | B2 | 12/2004 | Maeda |
| 6,847,390 | B2 | 1/2005 | Maeda |
| 6,853,392 | B2 | 2/2005 | Maeda |
| 2003/0001945 | A1 | 1/2003 | Maeda |
| 2003/0025785 | A1 * | 2/2003 | Nihei et al. ............ 347/250 |
| 2003/0067533 | A1 * | 4/2003 | Omori et al. ............ 347/248 |
| 2004/0125199 | A1 * | 7/2004 | Omori et al. ............ 347/249 |
| 2004/0160506 | A1 * | 8/2004 | Maeda ............ 347/129 |
| 2004/0239747 | A1 | 12/2004 | Maeda |

FOREIGN PATENT DOCUMENTS

| JP | 9-174917 | 7/1997 |
| JP | 3231610 | 9/2001 |
| JP | 2003-185953 | 7/2003 |
| JP | 2003-241474 | 8/2003 |
| JP | 2004-4510 | 1/2004 |
| JP | 2004-85777 | 3/2004 |
| JP | 3619332 | 11/2004 |

OTHER PUBLICATIONS

U.S. Appl. No. 11/036,025, filed Jan. 18, 2005, Maeda.

* cited by examiner

*Primary Examiner*—Stephen D Meier
*Assistant Examiner*—Sarah Al-Hashimi
(74) *Attorney, Agent, or Firm*—Oblon, Spivak, McClelland, Maier & Neustadt, L.L.P.

(57) ABSTRACT

An image forming apparatus includes a light source that emits a light beam in a main scanning direction according to image data to be used for image formation, a control unit that controls the light source, and detectors that detect the light beam. The main scanning direction is divided into areas and a cycle of a pixel clock is corrected in each area independently based on detection results of the detectors so as to correct an image position and image magnification.

21 Claims, 31 Drawing Sheets

IMAGE FORMING APPARATUS, PRINTER APPARATUS, FACSIMILE APPARATUS, AND COPYING MACHINE

CROSS-REFERENCE TO RELATED APPLICATIONS

The present document incorporates by reference the entire contents of Japanese priority document, 2005-017402 filed in Japan on Jan. 25, 2005.

BACKGROUND OF THE INVENTION

1. Field of the Invention

The present invention relates to an image forming apparatus that controls positioning and magnification of a main scanning image.

2. Description of the Related Art

In image forming apparatuses employing a light beam scanning device, a light beam is modulated according to image data, subjected to an equal angular velocity deflection in a main scanning direction by rotation of a deflecting unit such as a polygon mirror, and further subjected to, for example, a correcting process of the equal angular velocity deflection to an equal velocity deflection using an fθ lens, and then the light beam is scanned on an image carrier (hereinafter, "photoconductor").

However, image magnification differs among different apparatuses due to fluctuation in characteristics of parts such as lenses constituting respective light beam scanning devices. Characteristics in a main scanning direction vary even in a single apparatus, and therefore, magnification errors occur. Particularly, when a plastic lens is used, a shape and a refraction index of the lens vary due to changes in the environmental temperature or changes in the temperature in the apparatus. Therefore, a scanning position on the photoconductor varies, and a magnification error in the main scanning direction occurs, such that a high quality image cannot be obtained. In an apparatus in which a plurality of color images are formed using a plurality of laser beams and lenses, color registration deviation occurs due to respective magnification errors, such that an image with high quality cannot be obtained. Accordingly, it is necessary to match image magnifications of respective colors as much as possible by reducing full width magnification errors and partial magnification errors of the respective colors.

One approach is to correct such an image magnification error in the main scanning direction, so that fluctuation among different machines and different colors can be reduced by variably controlling a pixel clock frequency.

However, since actual magnification characteristics in the main scanning direction are uneven along the main scanning direction and magnification errors differ at different portions along the main scanning direction, a mismatch among image magnifications or a positional deviation among images occurs partially. In color image forming apparatuses that form images of plural colors, there is a possibility that a color registration deviation occurs partially among respective portions in the main scanning direction.

In view of these circumstances, Japanese Patent Application Laid-Open Nos. 2004-4510, 2004-85777, H9-174917, and 2003-185953, and Japanese Patent No. 3231610 disclose a technique for correcting an image magnification error in the main scanning direction and a main scanning image position deviation generated by characteristics of parts such as a lens or a polygon mirror constituting a light beam scanning device, or generated due to fluctuations of the characteristics, in an image forming apparatus that forms images by conducting scanning of a light beams.

In Japanese Patent Application Laid-Open No. 2004-4510, partial magnification correction is performed with high accuracy by changing a phase of a pixel clock output for each period obtained by dividing a constant scanning period of a laser beam at intervals shorter than a pixel clock period.

In Japanese Patent Application Laid-Open No. 2004-85777, partial magnification corrections of respective colors except for a reference color in a color image forming apparatus are performed by designating magnification for each section in the main scanning direction and changing a clock speed for each predetermined number of counts, thereby preventing color registration deviation.

In Japanese Patent Application Laid-Open No. H9-174917, data for correcting an expansion and contraction distortion measured in advance for respective facets of a rotary polygon mirror are stored for three periods of a reference period, a short period, and a long period of a pixel clock, all dots in the main scanning direction are divided into a plurality of sections, and respective facet distortions are corrected, while data items for the three periods are being applied, so that a color image with high quality can be obtained.

In Japanese Patent No. 3231610, data for correcting an expansion and contraction distortion measured in advance for respective facets of a rotary polygon mirror are stored for three periods of a reference period, a short period, and a long period of a pixel clock, all dots in the main scanning direction are divided into a plurality of sections, and respective facet distortions are corrected, while data for the three periods are applied, so that a color image with high quality can be obtained. All dots in the main scanning direction are divided into a plurality of sections, and deviation amounts between an actual boundary position and a reference boundary position in respective sections are obtained in advance before an optical system is assembled to a main unit, so that deviation is corrected for each section based on the deviation amounts. A position deviation detecting pattern is formed on a transfer belt, so that deviation is corrected for each section based on a deviation amount from a predetermined interval.

In Japanese Patent Application Laid-Open No. 2003-185953, sensors that detect a light beam are provided on a writing start side and a writing termination side outside an effective writing region, and each dot position of image data within the effective writing region is corrected to an arbitrary position based on a fluctuation amount of a scanning time between the sensors, thereby suppressing occurrence of an color registration deviation. The effective writing region is divided into a plurality of image data regions, and a correction value is set for each image data region, thereby reducing data amount and downsizing a controller.

Image magnification and an image position can be corrected at a corresponding position by changing a phase or a frequency of a pixel clock (making a width of an image clock longer or shorter). However, it is necessary to detect an image magnification deviation amount and an image position deviation amount required for the correction using a sensor, a charge coupled device (CCD), or the like, as described in Japanese Patent Application Laid-Open Nos. 2004-4510, 2004-85777, H9-174917, and 2003-185953.

For example, to correct image magnification at a point at which a deviation amount is detected, it is necessary to correct pixel clocks positioned on a scanning start side with respect to the point. Even if pixel clocks positioned downstream from the point are corrected, an image magnification error occurs corresponding to the correction, such that errors further occur in image magnification downstream from the point.

As described in Japanese Patent Application Laid-Open Nos. 2004-4510, 2004-85777, H9-174917, and 2003-185953 and Japanese Patent No. 3231610, it is necessary to obtain a deviation amount before providing the optical system in the apparatus main unit to perform correction based on the deviation amount, or it is necessary to form a pattern for detecting a position deviation on a transfer belt after providing the optical system in the apparatus main unit to conduct correction based on a deviation amount from the predetermined distance. However, even if both of these corrections are conducted, position deviation of an image might occur on recording paper due to a problem in a conveying state of the paper (e.g. an angle at which the paper is conveyed).

By mounting as many sensors for detecting a position deviation detecting pattern in a main unit of an apparatus as possible, a magnification error in the main scanning direction can be detected and corrected with higher precision. However, an increase in the number of sensors increases the cost of the main unit, and therefore, in reality, not many sensors can be mounted in the main unit.

SUMMARY OF THE INVENTION

It is an object of the present invention to at least solve the problems in the conventional technology.

According to an aspect of the present invention, an image forming apparatus includes a light source that emits a light beam in a main scanning direction according to image data to be used for image formation, a control unit that controls the light source by variably controlling a cycle of a pixel clock by each pixel in the main scanning direction, a plurality of detectors that detects a light beam emitted from the light source in the main scanning direction, and a correcting unit that corrects an image position and image magnification in the main scanning direction by changing the cycle of the pixel clock by each pixel based on detection results of each of the detectors, wherein the correcting unit corrects the image position and the image magnification in the main scanning direction entirely by dividing the main scanning direction into a plurality of areas and changing the cycle of the pixel clock for each pixel in each of the areas independently, and each of the detectors is arranged at positions corresponding to boundaries between the areas in the main scanning direction.

According to another aspect of the present invention, an image forming apparatus includes a light source that emits a light beam in a main scanning direction according to image data to be used for image formation, a control unit that controls the light source by variably controlling a cycle of a pixel clock by each pixel in the main scanning direction, a pattern forming unit that forms patterns used for image correction, a plurality of sensors that detect the patterns formed by the pattern forming unit, and a correcting unit that corrects an image position and image magnification in the main scanning direction by changing the cycle of the pixel clock by each pixel based on detection results of the sensors, wherein the correcting unit corrects the image position and the image magnification in the main scanning direction entirely by dividing the main scanning direction into a plurality of areas and changing the cycle of the pixel clock for each pixel in each of the areas independently, and each of the sensors is arranged at positions corresponding to boundaries between the areas in the main scanning direction.

According to still another aspect of the present invention, an image forming apparatus includes a light source that emits a light beam in a main scanning direction according to image data to be used for image formation, a control unit that controls the light source by variably controlling a cycle of a pixel clock by each pixel in the main scanning direction, a deviation pattern forming unit that forms patterns used for image deviation correction, at least one deviation sensor that detects image deviation from the patterns formed by the deviation pattern forming unit, and a correcting unit that corrects an image position and image magnification in the main scanning direction by changing the cycle of the pixel clock by each pixel based on a detection result of the deviation sensor, wherein the correcting unit corrects the image position and the image magnification in the main scanning direction entirely by dividing the main scanning direction into a plurality of areas and changing the cycle of the pixel clock for each pixel in each of the areas independently, and each of the patterns is formed at positions corresponding to boundaries between the areas in the main scanning direction.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be described below with reference to accompanying drawings. The present invention is not limited to these embodiments.

Figure 1:
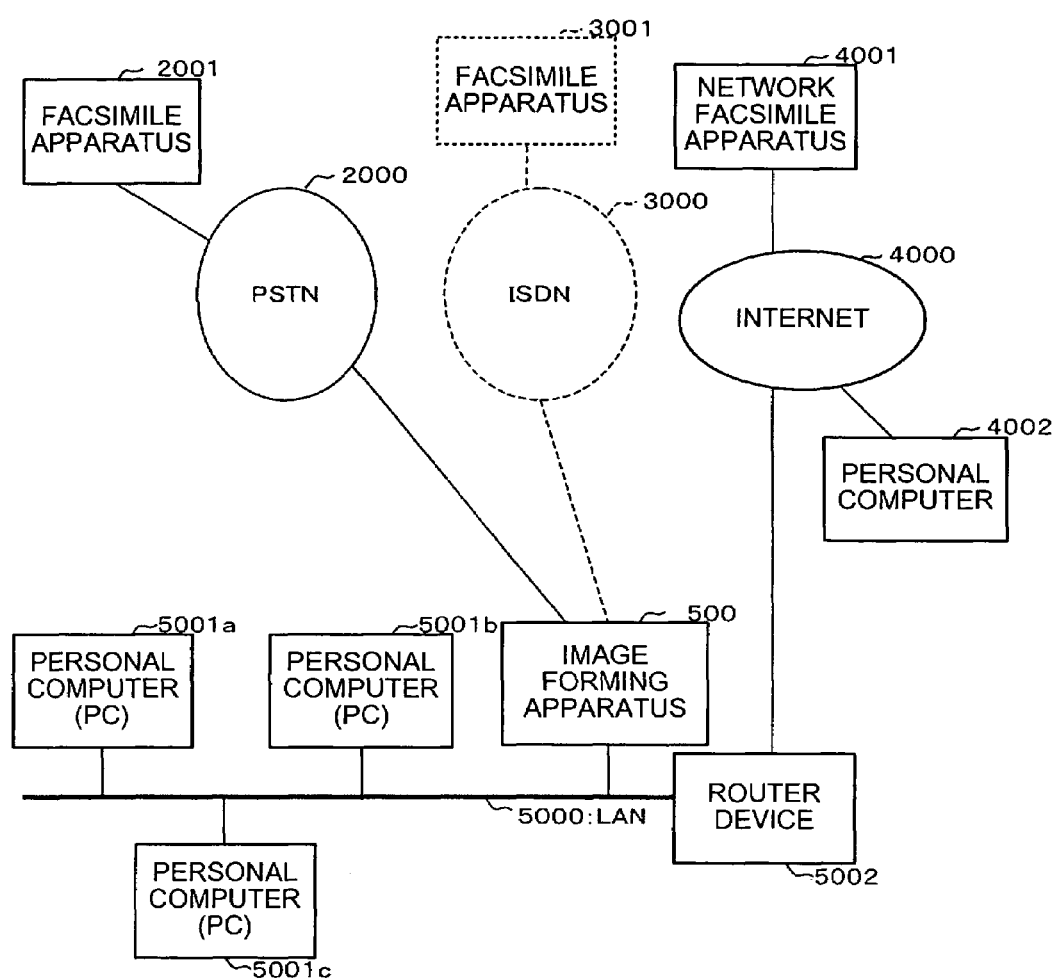
FIG. 1 is a system configuration diagram of an image forming apparatus according to an embodiment of the present invention.

A system configuration including an image forming apparatus 500 according to an embodiment of the present invention is shown in FIG. 1.

In FIG. 1, the image forming apparatus 500 can transmit and receive data with a facsimile apparatus 2001 on a public switched telephone network (PSTN) 2000 via the PSTN 2000. If the image forming apparatus 500 includes an interface with an integrated services digital network (ISDN) 3000, it can also transmit and receive image data with a facsimile apparatus 3001 on the ISDN 3000 (the interface is not included in the embodiment of the invention). The image forming apparatus 500 is connected to a local area network (LAN) 5000 and is connected to the Internet 4000 via a router device 5002 that performs packet conversion so that it can transmit and receive image data with a personal computer (PC) 4002 on the Internet 4000 using e-mail, and transmit and receive image data with a network facsimile apparatus 4001 on the Internet 4000 using e-mail or based on International Telecommunications Union Telecommunication standardization sector (ITU-T) Recommendation T.38, or the like. The image forming apparatus 500 can transmit and receive image data with PCs 5001a, 5001b, 5001c, and the like on the LAN 5000.

That is, the image forming apparatus 500 includes multiple functions of, for example, an ordinary facsimile apparatus via a public line, a network facsimile apparatus, a scanner apparatus for the PC 5001a and the like, and a printer apparatus and a copying machine for the PC 5001a and the like.

Figure 2:
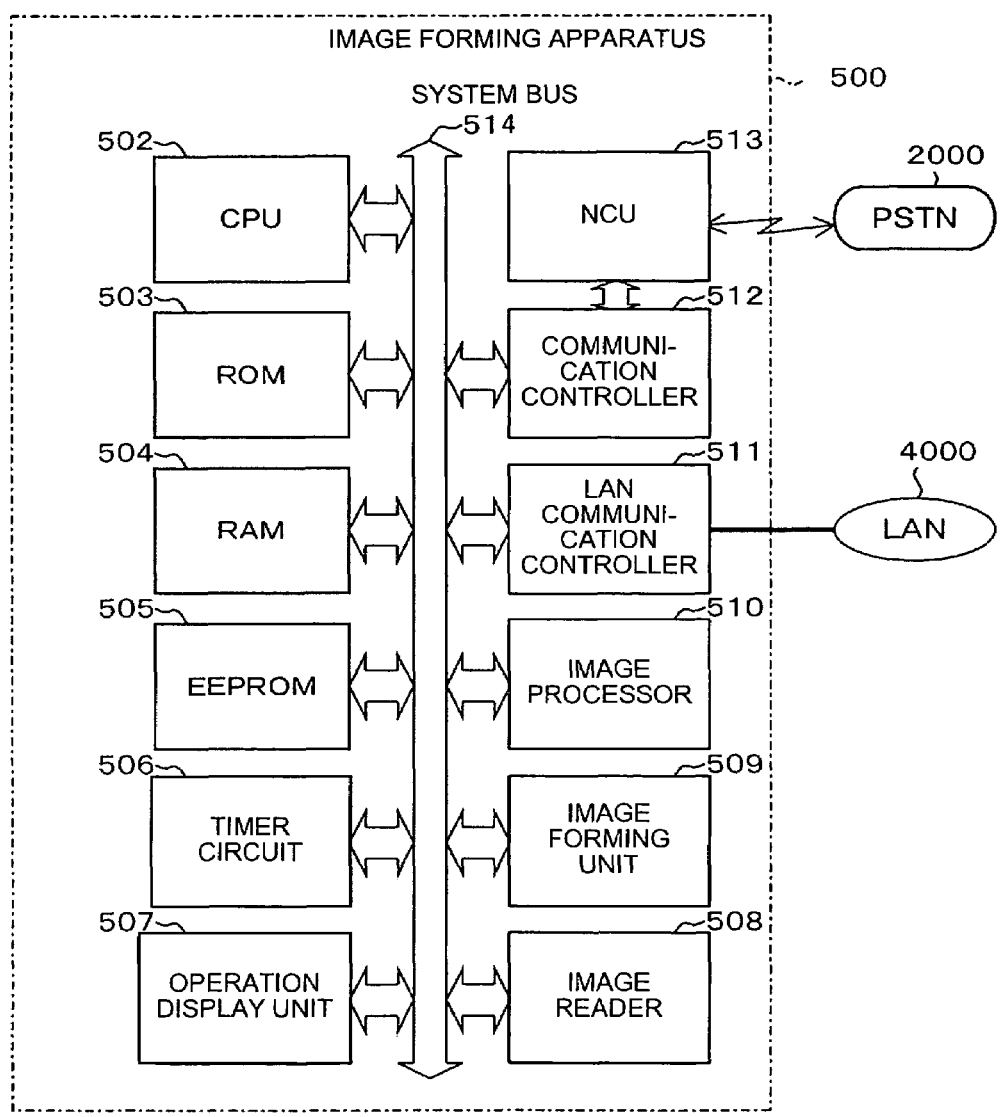
FIG. 2 is a block configuration diagram of the image forming apparatus.

FIG. 2 is a block configuration diagram of the image forming apparatus 500.

In FIG. 2, a central processing unit (CPU) 502 controls respective units of the apparatus based on a control program written in a read only memory (ROM) 503 while using a random access memory (RAM) 504 as a working area, processes various data, and performs protocol control.

The ROM 503 stores a control program used by the CPU 502 to control respective units in the apparatus, and various data required for control on font data or the like corresponding to various character codes.

The RAM 504 is used as the working area for the CPU 502, as described above.

An electric erasable programmable ROM (EEPROM) 505 stores various information required for an apparatus operation and holds storage contents thereof even while the power for the apparatus is OFF, and it can be replaced with a static RAM (SRAM) or a magnetic disk apparatus backed up by a battery.

A timer circuit 506 always counts current date and current time, and the CPU 502 can read out data in the timer circuit 506 via a system bus 514 to know current date and hour (date and time).

An operation display unit 507 has various keys arranged for reception of operation inputs from a user and includes a display such as a liquid crystal display device, and displays operation statuses of the apparatus and various messages to be notified to the user.

A reader 508 reads a document to obtain image data therefrom.

An image forming unit 509 outputs image data on a recording paper as a print (described in detail later).

An image processor 510 performs various processings regarding image data to be handled in the image forming apparatus 500, such as a coding and compressing processing to raw image data, a decoding and decompressing processing to coded and compressed data, a binarization processing, a variable power processing, an enlarging and reducing processing, an image correcting processing, a rearranging processing of pixels in each main scanning direction constituting image data, and a processing for adding additional information such as character string information about a transmission date and time and a reception date and time.

A LAN communication controller 511 is a so-called "NIC (network interface card)", and it is connected to the LAN 5000 for transmitting and receiving a transmission control protocol/Internet protocol (TCP/IP) with the CPU 502 on a LAN protocol to transmit and receive various pieces of information according to an upper protocol thereof.

A communication controller 512 is connected to the PSTN 2000 via a network control unit (NCU) 513 to control communication with another communication terminal. The communication controller 512 controls the NCU 513 to detect a pulse of a ringing voltage detected by the NCU 513, detect a dual tone modified frequency (DTMF) signal, detect a tone signal, and to call at a transmission time. The communication controller 512 has a modem to demodulate reception data (modulated data) received from another communication terminal, while performing modulation and transmission of data at a transmission time. Specifically, the communication controller 512 has a low speed modem function ($V_0 21$ modem) for transmitting and receiving a G3 type facsimile control signal, and respective modem functions of $V_0 17$, $V_0 33$, $V_0 34$, $V_0 29$, and $V_0 27$ter which are high speed modem functions for mainly transmitting and receiving document image data based on ITU-T Recommendation $T_0 30$.

The NCU 513 is connected to the PSTN 2000 to close a line, detect a calling signal (ringing), and the like.

The system bus 514 is a signal line including a data bus, address buses, a control bus, an interruption signal line, and the like for transmission and reception of data among respective units.

With the above configuration, the image forming apparatus 500 outputs image data on a recording paper as a printer apparatus, a receiving unit of a facsimile apparatus, or a copying machine, in which the image forming unit performs the image formation, as described above.

Each one of the exemplary embodiments of the present invention will be explained below.

A first embodiment of the present invention will be explained.

Figure 3:
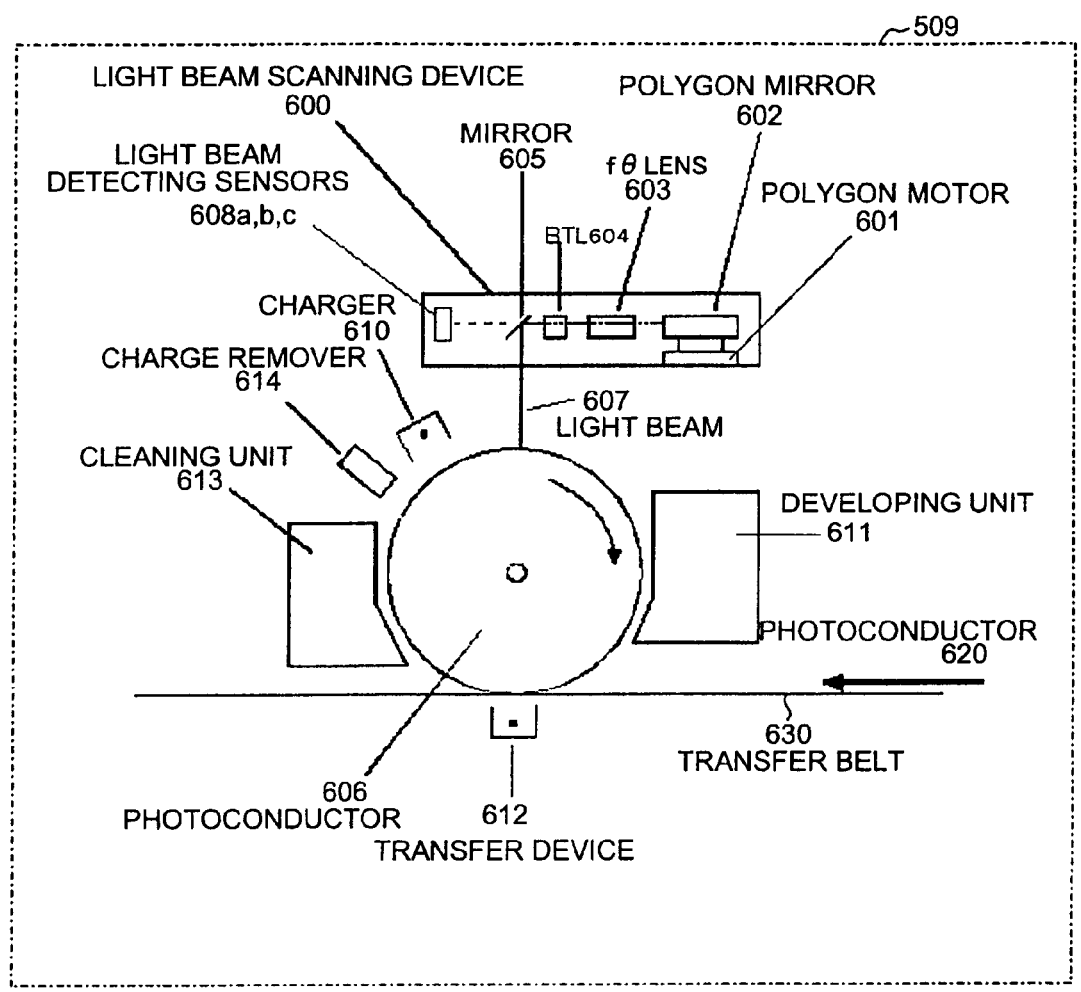
FIG. 3 is a configuration diagram of an image forming unit shown in FIG. 2.

FIG. 3 is a configuration diagram of the image forming unit 509.

In a light beam scanning device 600 shown FIG. 3, a light beam emitted from a laser diode (LD) (not shown) that is modulated and turned on according to content of image data is collimated by a collimating lens (not shown) to pass through a cylinder lens (not shown), is deflected by a polygon mirror 602 rotated by a polygon motor 601 to pass through an fθ lens 603 and pass through a BTL 604, and is reflected by a mirror 605 to perform scanning on a photoconductor 606. The term "BTL" is an abbreviation of "barrel toroidal lens", and it conducts focusing in a sub-scanning direction (converging function and position correction in the sub-scanning direction (plane tilt, etc.)).

The mirror 605 for scanning a light beam 607 on the photoconductor 606 is a half mirror (a semi-transmissive reflecting mirror), where a portion of the light beam 607 is reflected substantially downward to advance to a surface of the photoconductor 606 while the remaining portion thereof passes through the half mirror 605 to advance straightly. To detect a light beam that has passed through the (half) mirror 605, three light beam detecting sensors 608a, 608b, and 608c are arranged behind the (half) mirror 605 in the main scanning direction. Three light beam detecting sensors arranged in the first embodiment.

A charger 610, a developing unit 611, a transfer device 612, a cleaning unit 613, and a charge remover 614 are arranged about the photoconductor 606, so that an image is formed on a recording paper 620 placed on a transfer belt 630 to be conveyed and sub-scanned by charging, exposing, developing, and transferring included in an ordinary electrophotographic process. A toner image on the recording paper 620 is fused by a fusing device (not shown).

Figure 4:
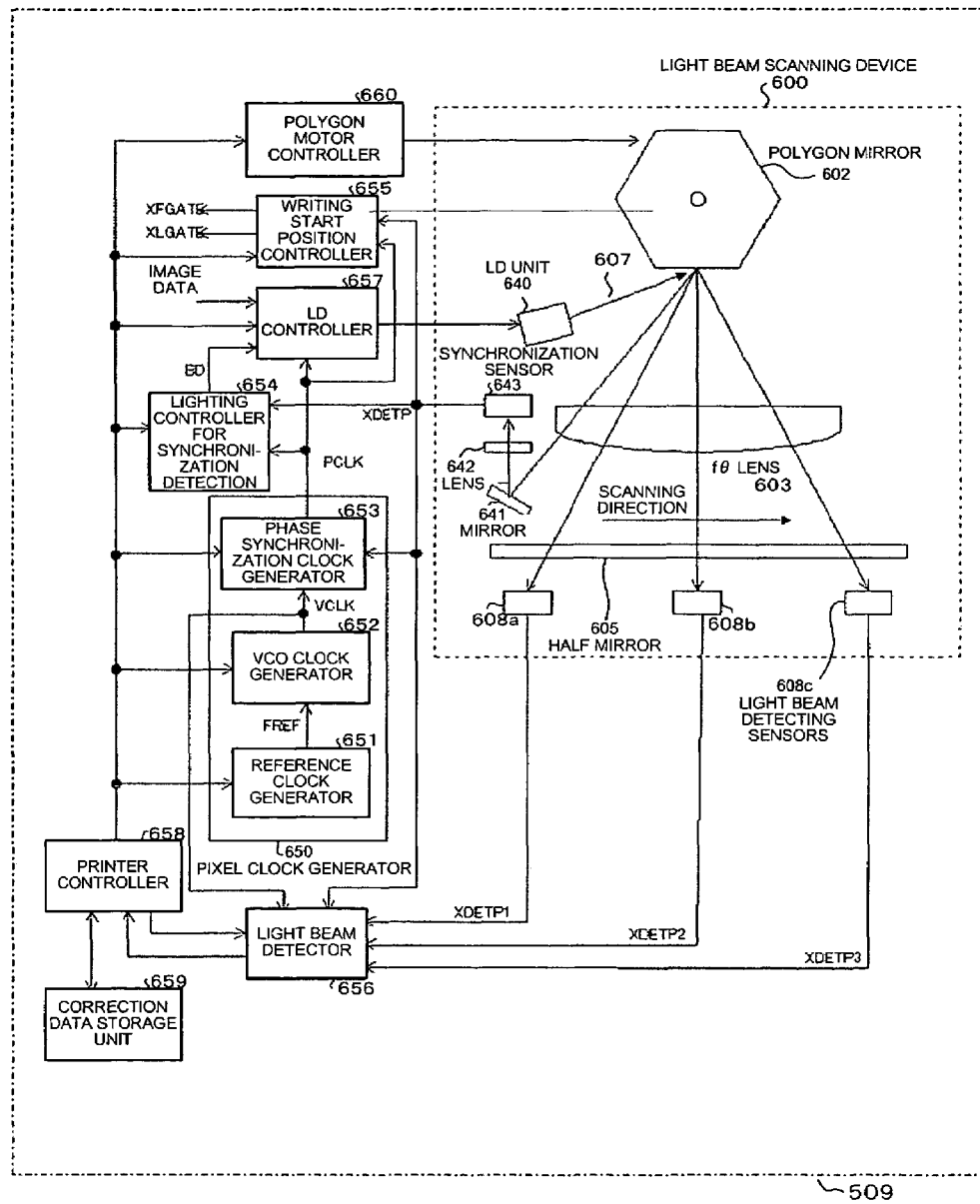
FIG. 4 depicts an image formation controller and a light beam scanning device in the image forming unit.

FIG. 4 depicts an image formation controller and a light beam scanning device in the image forming unit 509. A synchronization detecting sensor 643 that detects a light beam is disposed on an image writing side (on the left side in FIG. 4) at an end of the light beam scanning device 600 in the main scanning direction. A light beam that has passed through the fθ lens 603 is reflected by a mirror 641 and is converged by a lens 642 to be input into the synchronization detecting sensor 643.

As explained with reference to FIG. 3, the mirror 605 for scanning the light beam 607 on the photoconductor 606 is constituted as a half mirror (semi-transmissive reflecting mirror), and the three light beam detecting sensors 608a, 608b, and 608c are arranged at both ends and a central portion of the half mirror 605 to detect the light beam having passed therethrough.

When the light beam 607 has passed through the synchronization detecting sensor 643, a synchronization detection signal XDETP is output from the synchronization detecting sensor 643 to be fed to a pixel clock generator 650, a lighting controller for synchronization detection 654, a writing start position controller 655, and a light beam detector 656.

In the pixel clock generator 650, a pixel clock PCLK synchronized with the synchronization detection signal XDETP is generated to be fed to an LD controller 657 and the lighting controller for synchronization detection 654.

The pixel clock generator 650 includes a reference clock generator 651, a voltage controlled oscillator (VCO) clock generator 652, and a phase synchronization clock generator 653.

Figure 5:
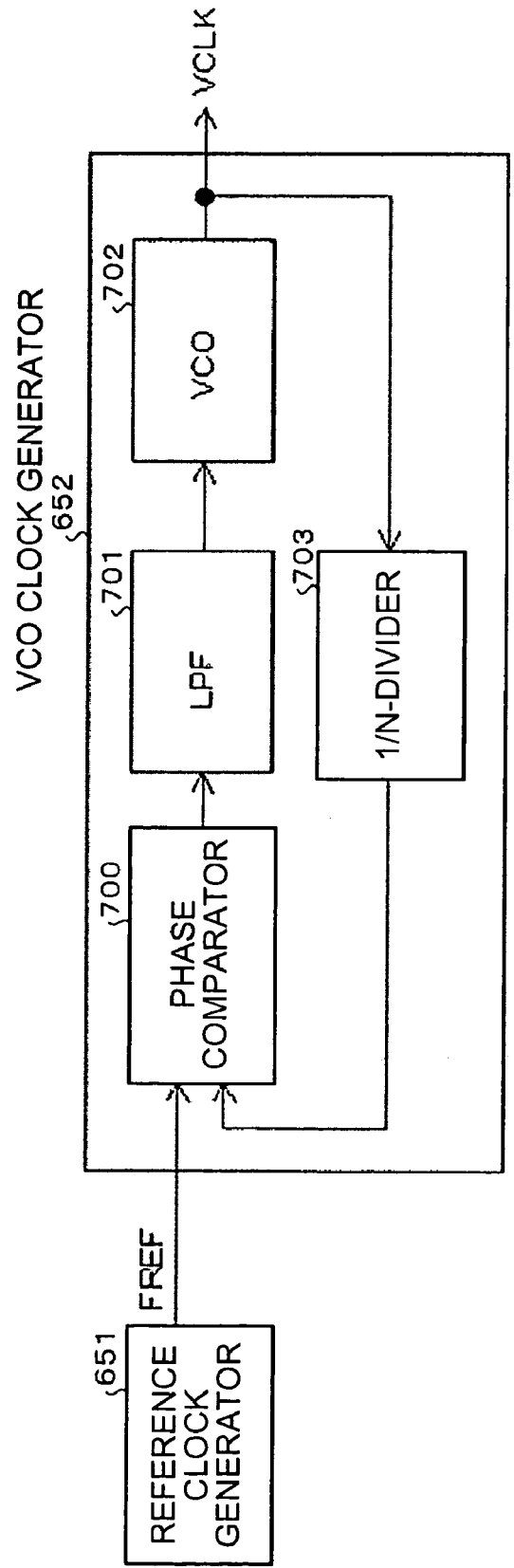
FIG. 5 is a configuration diagram of a VCO clock generator shown in FIG. 4.

FIG. 5 depicts the VCO clock generator (PLL circuit: phase locked loop) 652. A reference clock signal FREF from the reference clock generator 651 and a signal obtained by 1/N-dividing an output VCLK in a 1/N-divider 703 are input into a phase comparator 700. In the phase comparator 700, falling edges of phases of both the signals are compared with each other, and an error component is output as a constant current. The output from the comparator 700 is fed to a VCO 702, after unnecessary high frequency components and noises are removed therefrom by a lowpass filter (LPF) 701. An oscillation frequency depending on the output of the LPF is output from the VCO 702. Accordingly, the frequency of the output VCLK can be changed by setting the frequency of FREF from a printer controller 658 and the dividing ratio N variable.

In the phase synchronization clock generator 653, a pixel clock PCLK is generated from the VCLK set to a frequency eight times the pixel clock frequency, and a pixel clock PCLK synchronized with the synchronization detection signal XDETP is generated. A phase of a rising of the PCLK is advanced or delayed by a half cycle of the VCLK based on the correction data from the printer controller 658.

An amount of a phase of a pixel clock to be changed and a direction (advancing or delaying direction) thereof are stored in a correction data storage unit 659. Correction data is fed to the phase synchronization clock generator 653 according to an instruction from the printer controller 658.

By changing the frequency of FREF from the printer controller 658 and the dividing ratio N, the frequency of VCLK is changed, so that the frequency of the pixel clock PCLK is changed. By changing the frequency of PCLK, an entire magnification of an image can be changed.

The lighting controller for synchronization detection 654 first turns on an LD forcibly lighting signal BD to the LD controller 657 to forcibly turn on the LD in order to first detect the synchronization detection signal XDETP. However, after detecting the synchronization detection signal XDETP, the lighting controller 654 generates the LD forcibly lighting signal BD for turning on the LD reliably according to the synchronization detection signal XDETP and the pixel clock PCLK at a detectable timing of the synchronization detection signal XDETP such that flare light does not occur, and for turning off the LD after detecting the synchronization detection signal XDETP to feed the LD forcibly lighting signal BD to the LD controller 657.

The LD controller 657 controls ON and OFF of laser according to image data synchronized with the forcibly lighting signal for synchronization detection BD and the pixel clock PCLK. A laser beam is emitted from the LD unit 640, and it is deflected by the polygon mirror 602 to pass through the fθ lens 603, thereby performing scanning on the photoconductor 606.

A polygon motor controller 660 controls rotation of a polygon motor to a predetermined rotating speed according to a control signal from the printer controller 658.

The writing start position controller 655 generates a main scanning gate signal XLGATE and a sub-scanning gate signal XFGATE for determining an image writing start timing and an image width according to the synchronization detection signal XDETP, the pixel clock PCLK, a control signal from the printer controller 658, and the like.

The light beam detector 656 detects detection signals XDETP1, XDETP2, and XDETP3 output from the light beam detecting sensors 608a, 608b, and 608c according to scanning of light beam thereon to measure respective time differences between the synchronization detection signal XDETP and the detection signal XDETP1, between the detection signal XDETP1 and the detection signal XDETP2, and between the detection signal XDETP2 and the detection signal XDETP3 by using clock signals VCLK. The printer controller 658 calculates correction data values in respective correction areas for correcting an image position and an image magnification from the result of the measurement and stores the values in the correction data storage unit 659. The correction data includes an amount and a direction (to be delayed or to be advanced) of a phase of the pixel clock to be changed as explained above.

Set values for setting boundaries for correction areas such that the boundaries for the correction areas approximately conform to arrangement positions of the respective light beam detecting sensors 608a, 608b, and 608c are also stored in the correction data storage unit 659.

Figure 6:
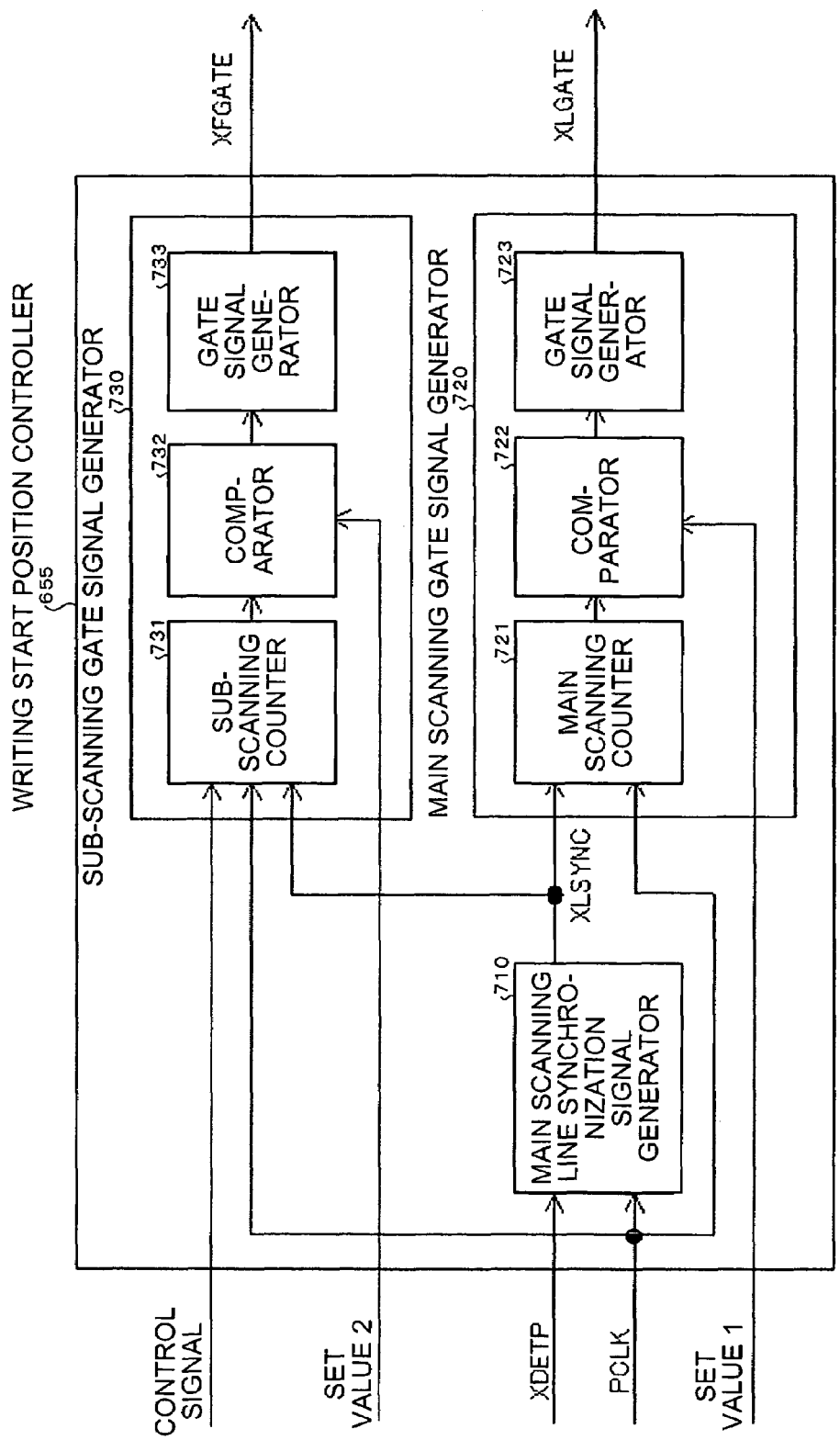
FIG. 6 is a configuration diagram of a writing start position controller shown in FIG. 4.

FIG. 6 is a configuration diagram of the writing start position controller 655. The writing start position controller 655 includes a main scanning line synchronization signal generator 710, a main scanning gate signal generator 720, and a sub-scanning gate signal generator 730. The main scanning line synchronization signal generator 710 generates a signal XLSYNC for actuating a main scanning counter 721 in the main scanning gate signal generator 720 and a sub-scanning counter 731 in the sub-scanning gate signal generator 730. The main scanning gate signal generator 720 generates a signal XLGATE for determining a timing (an image writing start timing in the main scanning direction) for taking in an image signal. The sub-scanning gate signal generator 730 generates a signal XFGATE for determining a timing (an image writing start timing in the sub-scanning direction) for taking in the image signal.

The main scanning gate signal generator 720 includes the main scanning counter 721 that operates according to XLSYNC and PCLK, a comparator 722 that compares a count value of the main scanning counter 721 with a set value 1 from the printer controller 658 to output the comparison result, and a gate signal generator 723 that generates XLGATE from the comparison result output from the comparator 722.

On the other hand, the sub-scanning gate signal generator 730 includes the sub-scanning counter 731 that operates according to the control signal from the printer controller 658, XLSYNC, and PCLK, a comparator 732 that compares a count value of the sub-scanning counter 731 with a set value 2 from the printer controller 658 to output the comparison result, and a gate signal generator 733 that generates XFGATE from the comparison result output from the comparator 733.

The writing start position controller 655 can correct a writing position regarding the main scanning for each one cycle of the clock PCLK, namely, for each one dot, and it can correct a writing position regarding the sub-scanning for each one cycle of the XLSYNC, namely, for each one line.

Figure 7:
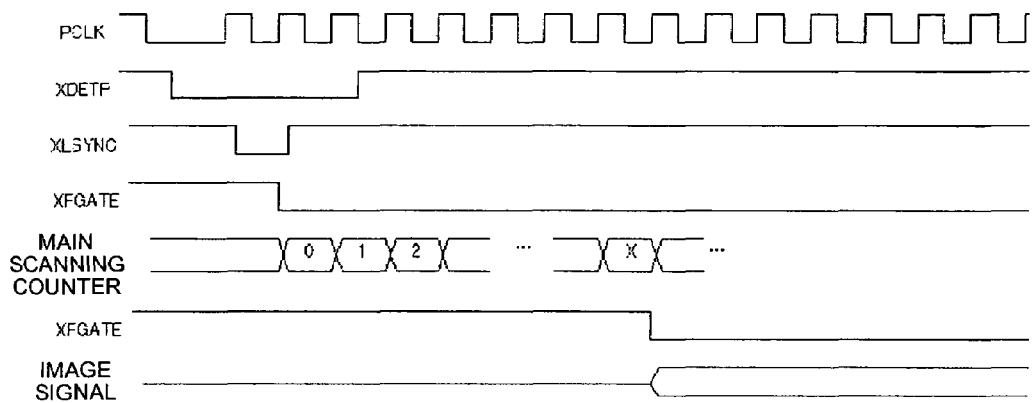
FIG. 7 is a timing chart in the writing start position controller.

FIG. 7 is a timing chart of the writing start position controller 655.

In FIG. 7, the counter is reset by the XLSYNC, and when the counter value has been counted up to the set value 1 ('X' in this case) set by the printer controller 658 according to PCLK, the comparison result is output from the comparator 722, so that XLGATE is changed to "L" (effective) by the gate signal generator 723. The XLGATE is a signal that is changed to 'L' by a period or section corresponding to an image width in the main scanning direction.

Regarding the sub-scanning, the counter value is counted up according to the XLSYNC, and the XFGATE is a signal that is changed to 'L' by a period or section corresponding to the image width in the sub-scanning direction.

Figure 8:
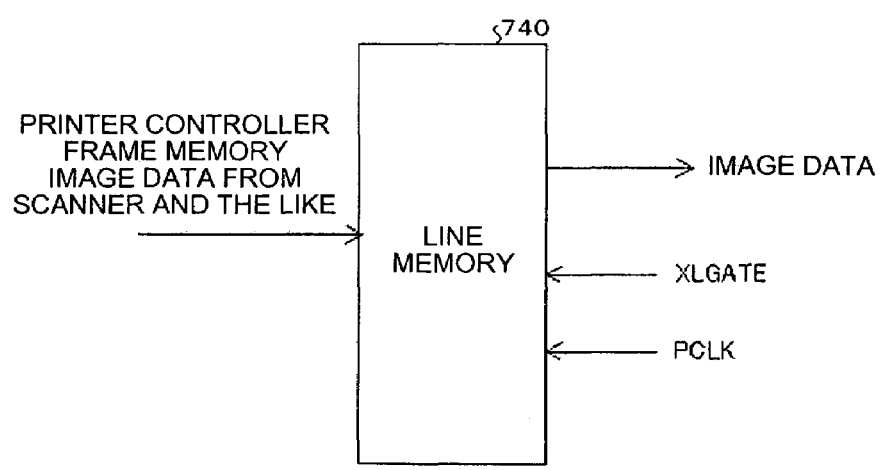
FIG. 8 is a configuration diagram of a front section of the image forming unit.

FIG. 8 is an example of a front section of the image forming unit 509.

The front section of the image forming unit 509 includes a line memory 740, and the line memory 740 takes in image data through various routes such as the printer controller, the frame memory, or the scanner at the timing of the XFGATE to output an image signal in synchronization with the PCLK by the section in which the XLGATE is 'L'. The output image data is fed to the LD controller 657 to turn on the LD at a proper timing.

Figure 9:
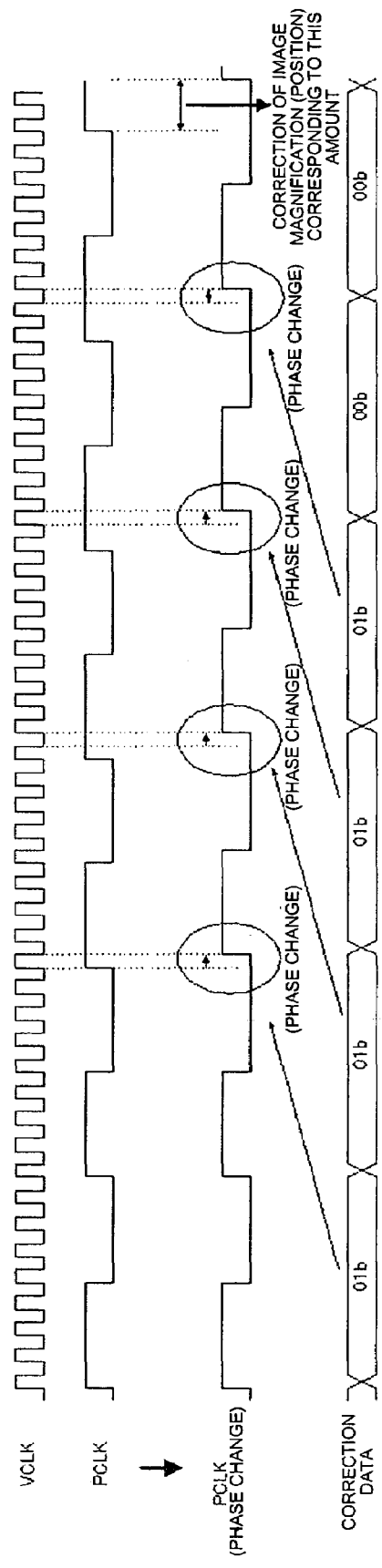
FIG. 9 is a timing chart of pixel clocks PCLK output from a pixel clock generator.

FIG. 9 is a timing chart of the pixel clock PCLK output from the pixel clock generator 650.

In FIG. 9, regarding the correction data from the printer controller 658, '00b' means no correction, '01b' means delay of a phase corresponding to $\frac{1}{16}$ PCLK, and '10b' means advance of a phase corresponding to $\frac{1}{16}$ PCLK. The correction data is fed in synchronization with the pixel clock PCLK to be reflected for a rising edge of the next PCLK. When the correction data is '00b', the PCLK has a frequency eight times the frequency of the VCLK, however, when the correction data is '01b', the phase of the rising edge is delayed by a half cycle of the VCLK, namely, $\frac{1}{16}$ PCLK. Thereafter, the phase of the rising edge is delayed to the original PCLK by $\frac{1}{16}$ PCLK. In FIG. 9, since a phase shift in a direction to be delayed is performed continuously four times, the phase of the PCLK is delayed by $\frac{4}{16}$ PCLK as a whole. That is, the image magnification and the image position are corrected by $\frac{4}{16}$ PCLK. Although not shown in FIG. 9, similar correction can also be performed regarding the advancing direction of the phase by setting '10b' as the correction data.

Figure 10:
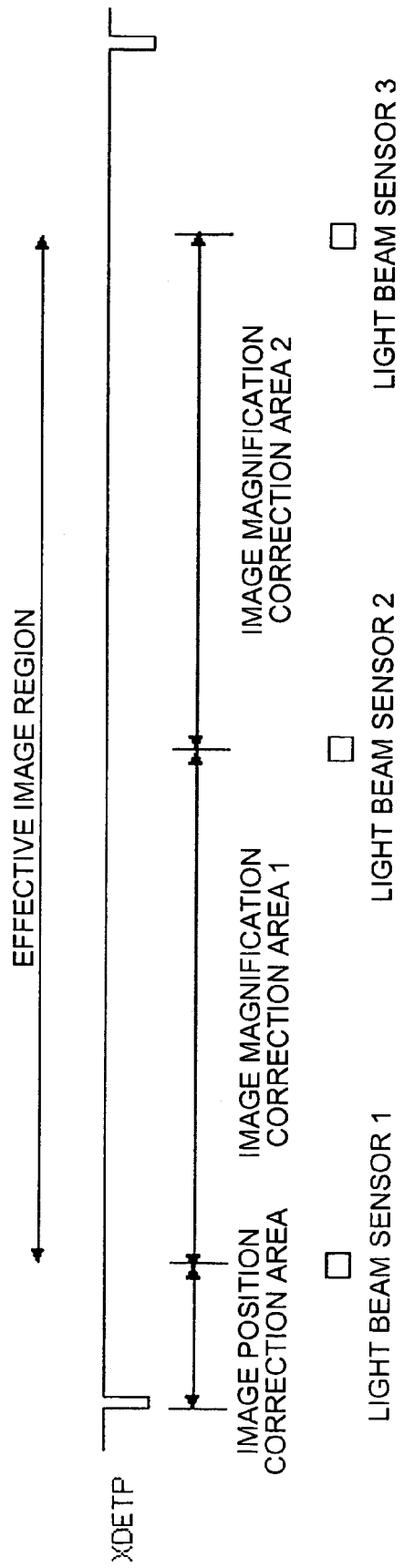
FIG. 10 depicts areas in which a sensor position is corrected.

FIG. 10 depicts areas in which a sensor position is corrected.

By changing the phase of the pixel clock, the image position can be corrected and a partial image magnification can also be corrected. When a whole image position is shifted (advanced or delayed), it is necessary to advance a phase from an actual image (toward the scanning start side), where a section from the detection of the synchronization detection signal XDETP that is the writing start reference signal in the main scanning direction to the image writing position is an area for correction. The phase of the pixel clock is changed in this section by the correction data stored in the correction data storage unit 659. Since the light beam detecting sensor 608a is disposed at an image end at the scanning start side, a boundary between the image position correction area and the image magnification correction area is set at a position corresponding to the position of the light beam detecting sensor 608a.

On the other hand, when the image magnification is corrected, it is necessary to perform correction by changing the phase of the pixel clock within an image region actually including an image magnification error. Therefore, it is meaningless to change the phase at a portion following the image termination portion. Therefore, the image region is the correction area, so that the phase of the pixel clock is changed within the image region by the correction data stored in the correction data storing unit 659. In the first embodiment, since the light beam detecting sensor 608b is disposed at a central portion of an image and the light beam detecting sensor 608c is disposed at an end of the image on the scanning termination side so as to correct image magnifications at an image left side and an image right side, a boundary between an image magnification correction area 1 for correcting the image left side and an image magnification correction area 2 for correcting the image right side is set to a position corresponding to the position of the sensor 608b and a boundary of the image magnification correction area 2 on the end of the image on the scanning termination side is set to a position corresponding to the position of the sensor 608c.

Figure 11:
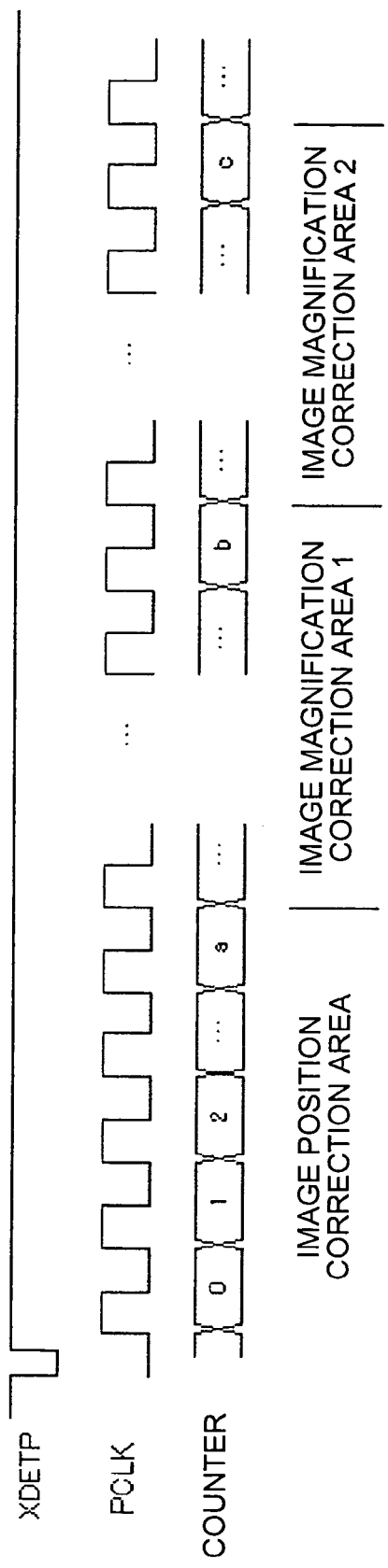
FIG. 11 depicts a setting method of correction areas corresponding to FIG. 10.

FIG. 11 depicts a setting method of the correction areas corresponding to FIG. 10.

The correction areas are determined by values of the counter operating according to the synchronization detection signal XDETP and the pixel clock PCLK. For example, as shown in FIG. 11, when set values of the boundaries for the respective areas are expressed as "a", "b", and "c", counter values 0 to a correspond to the image position correction area, counter values a+1 to b correspond to the image magnification correction area 1, and counter values b+1 to c correspond to the image magnification correction area 2. Change of the phase of the pixel clock is controlled in each area.

Regarding the set values (a, b, and c), since one cycle of the pixel clock PCLK corresponds to one dot, distances from the synchronization detecting sensor 643 to the respective light beam detecting sensors 608a, 608b, and 608c are known before they are assembled to the apparatus, so that the number of dots can be set to correspond to the distances. When a resolution in the main scanning direction is 600 dots per inch, since 1 inch is equal to 25.4 millimeters, one cycle of the PCLK corresponds to 42.3 micrometers.

Figure 12:
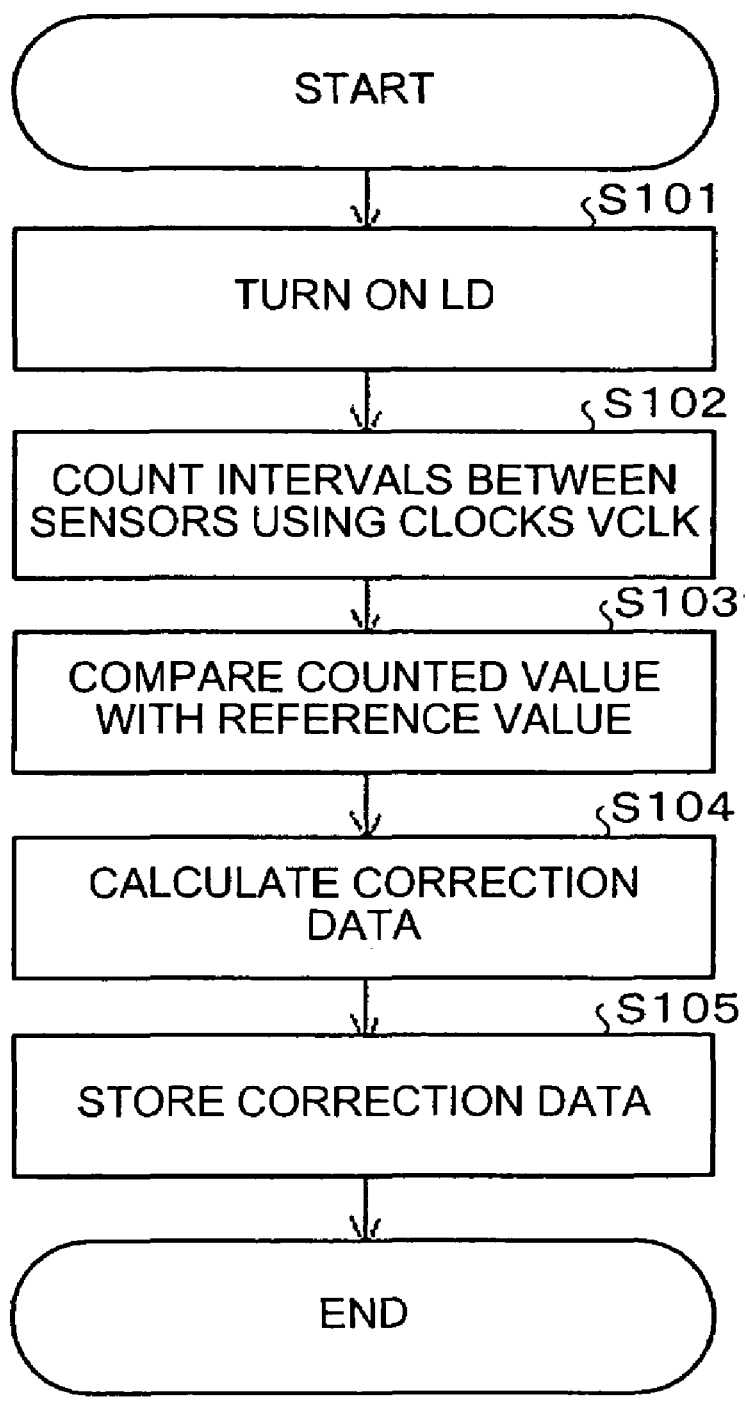
FIG. 12 is a flowchart of an image position and image magnification correcting procedure performed by the image forming apparatus.

FIG. 12 depicts the image position and image magnification correcting procedure performed by an image forming apparatus 1.

Before the procedure shown in FIG. 12 is performed, it is necessary to store reference count values among the respective sensors. The reference count values are calculated from arrangement positions of respective sensors. For example, when the sensor 608a is set at a position separated from the synchronization detecting sensor 643 by 15 millimeters, a resolution thereof is 1200 dots per inch (one dot corresponding to 0.0212 millimeter). When counting is conducted for each ⅛ of one dot (a unit correctable according to the phase control), a reference count value is (15 mm/0.0212 mm)× 8=5660.

The LD is first turned on (step S101). The LD is turned on in front of each sensor and it is then turned off, so as to confirm that light beam can be detected by each sensor reliably. An interval between detection signals output from each sensor is counted by clocks VCLK (step S102), and each count value is compared with each reference count value stored corresponding thereto in advance (step S103). From the comparison result, an amount and a direction (to be delayed or to be advanced) of a phase of a pixel clock to be changed are determined (calculated) and the result is stored in the correction data storage unit 659 as the correction data for each area.

A change of phases of pixel clocks is controlled for each area by a correction amount using the correction data during image forming operation. When the phases of the pixel clocks are changed, if phases of continuous pixel clocks within the area are changed continuously, the image position and the image magnification are concentrically changed in a region corresponding to the changed pixel clocks. Therefore, it is desirable to distribute the pixels whose phases should be changed, evenly in the area.

When mounting positions of all or any of the synchronization detecting sensor 643 and the light beam detecting sensors 608a, 608b, and 608c are changed due to replacement thereof, the boundary of each area is also changed, so that it is necessary to update the correction data stored in the correction data storage unit 659 so as to match with the boundary of the changed area.

When the number of sensors is increased to improve correction accuracy, the boundaries as well as the number of areas must be changed. For example, when five light beam detecting sensors are used, five set values for correction are required for five areas based on the synchronization detecting sensor 643. These values are stored in the correction data storage unit 659.

When the light beam scanning device 600, various sensors such as the synchronization detecting sensor 643, the light beam detecting sensors 608a, 608b, or 608c, and various parts such as lenses or mirrors in the light beam scanning device 600 are replaced with another one, the sensor positions as well as the image position and the image magnification may be influenced. Therefore, it is desirable reset the boundaries of the areas and reset the reference values.

In the first embodiment, the light beam detecting sensors 608a, 608b, and 608c are arranged inside the light beam scanning device 600 because this configuration achieves excellent replaceability and the positioning of the sensor for the beam 607 is stable. However, even if the light beam detecting sensors 608a, 608b, and 608c are arranged outside the light beam scanning device 600, similar advantage can be achieved.

A second embodiment of the present invention will be explained next.

The configuration of the light beam scanning device 600, the image forming control operation, and the correction areas in the image forming unit 509 are same as those shown in FIGS. 3 to 9 in the first embodiment.

Figure 13:
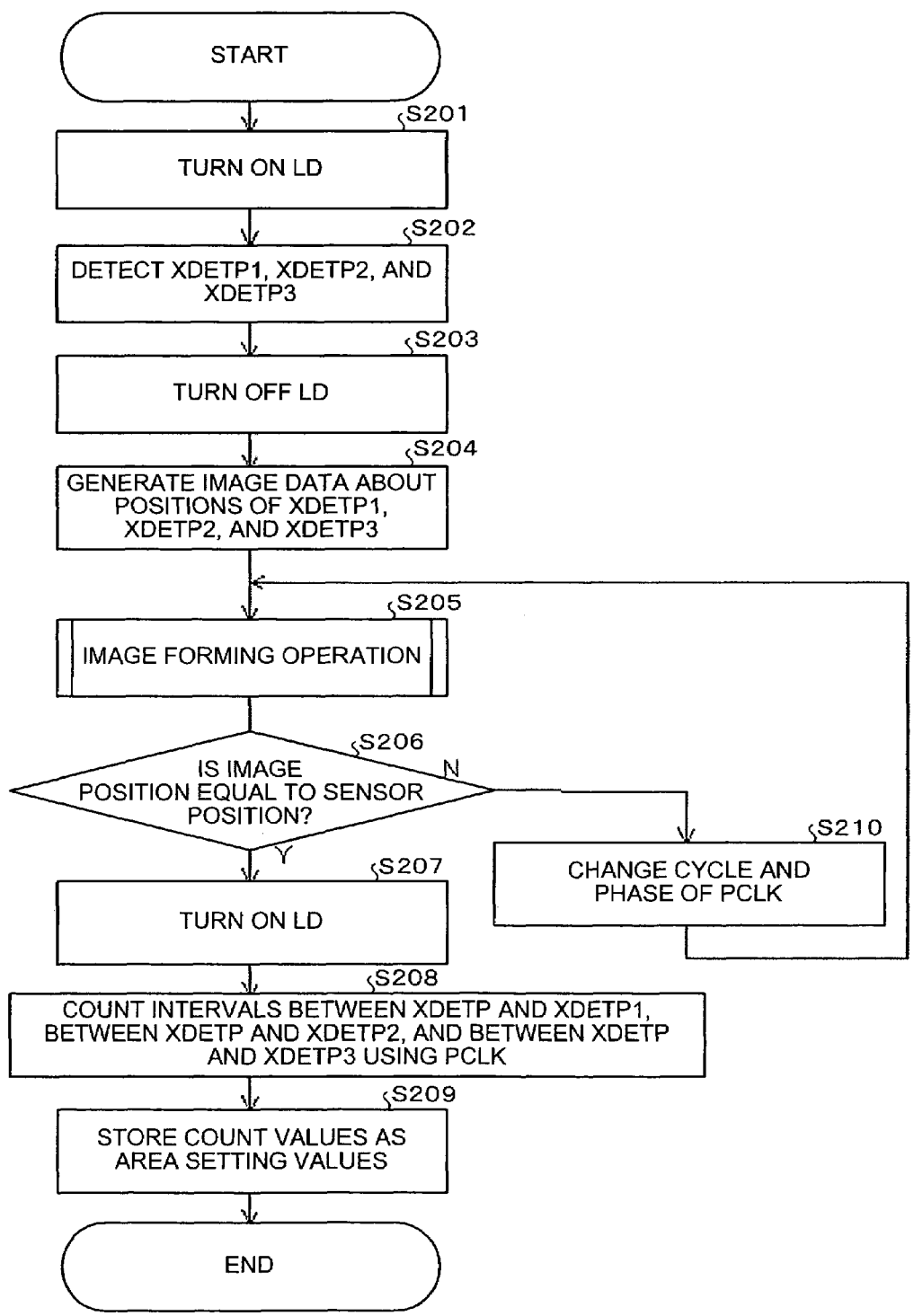
FIG. 13 is a flowchart of a boundary changing procedure of each area according to a second embodiment of the present invention.

FIG. 13 depicts a boundary changing procedure for respective areas in the second embodiment.

In FIG. 13, the LD is first turned (step S201), and detection signals XDETP1, XDETP2, and XDETP3 from respective light beam detecting sensors 608a, 608b, and 608c are detected (step S202). The LD is turned off (step S203), and image data (vertical line image) in which pixels corresponding to respective positions of XDETP1, XDETP2, and XDETP3 in the main scanning direction are set to black pixels, while pixels other than the black pixels are set to white pixels, is generated (step S204).

Image formation is performed using the image data (step S205), and whether the formed respective vertical line positions and the respective sensor positions conform to each other is checked (step S206). When the formed vertical line positions and the respective sensor positions conform to each other, it means that the respective sensors have detected corresponding vertical line black pixels.

When there is any sensor position that does not conform with the corresponding vertical line position at the determination step S206 (determination step S206: No), the frequency and the phase of the pixel clock PCLK are changed until the formed vertical line positions conform to the respective sensor positions and the determination at step S206 becomes affirmative (step S210), and the process returns back to step S205 to repeat the image forming operation.

When determination at step S206 becomes affirmative, the LD is turned on again (step S207), intervals between XDETP and XDETP1, between XDETP and XDETP2, and between XDETP and XDETP 3 are counted using adjusted PCLK (step S208), and the count values are stored in the correction data storage unit 659 as set values for respective areas (step S209), so that an image forming operation is then conducted using these values.

A third embodiment of the present invention will be explained next.

Figure 14:
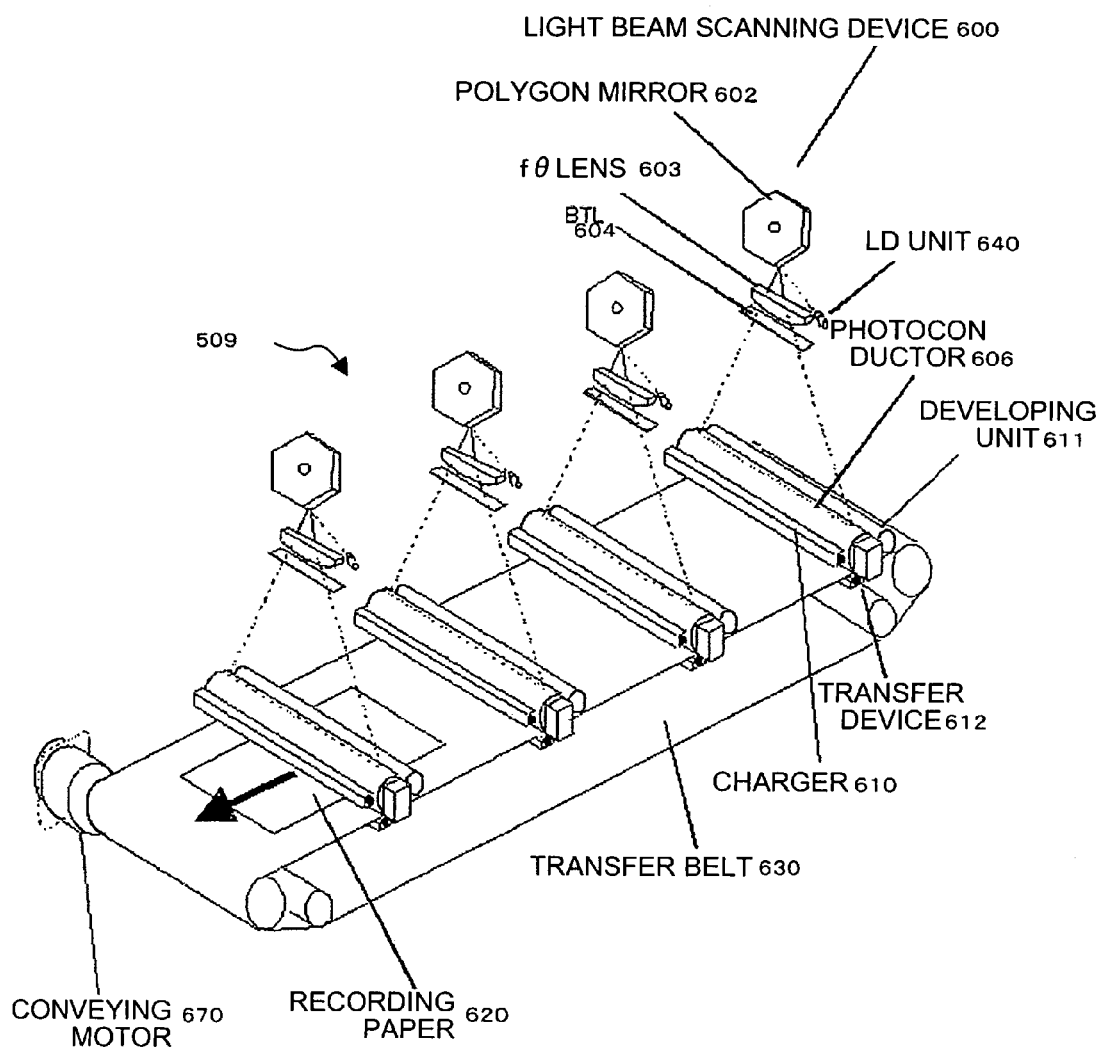
FIG. 14 is a configuration diagram of the image forming unit that performs a four-drum type color image formation according to a third embodiment of the present invention.

FIG. 14 is a configuration diagram of an image forming unit 509a that performs a four-drum type image formation.

The image forming unit 509a includes four sets of image forming units (a photoconductor, a developing unit, a charger, and a transfer device) that form a full color image obtained by superimposing four color images of yellow (Y), magenta (M), cyan (C), and black (BK). That is, the image forming units 509a of respective colors having the configuration shown in FIG. 3 are arranged in parallel along the transfer belt 630.

A full color image is formed on the recording paper 620 by forming a first color image on the recording paper 620 conveyed in a direction of arrow by the transfer belt 630 and next transferring second, third, and fourth color images thereon, thereby superimposing images of four colors, and it is fused on the recording paper 620 by a fusing device (not shown).

The image forming unit for each color includes, around the photoconductor, the charger 610, the developing unit 611, the transfer device 612, the cleaning unit (not shown), and the charge remover (not shown) corresponding to the configuration shown in FIG. 3, and it forms an image on a recording paper according to charging, exposing, developing, and transferring included in an ordinary electrophotographic process.

Since four image forming units 509a (including a light beam scanning device 600) with the configuration shown in FIG. 3 are provided corresponding to the respective colors, the units described in the first and the second embodiments can be applied to the third embodiment. In this case, since each image forming unit includes the light beam scanning devices individually, setting of area boundaries, and corrections of an image position and an image magnification are individually performed in the respective image forming units.

A fourth embodiment of the present invention will be explained next.

Figure 15:
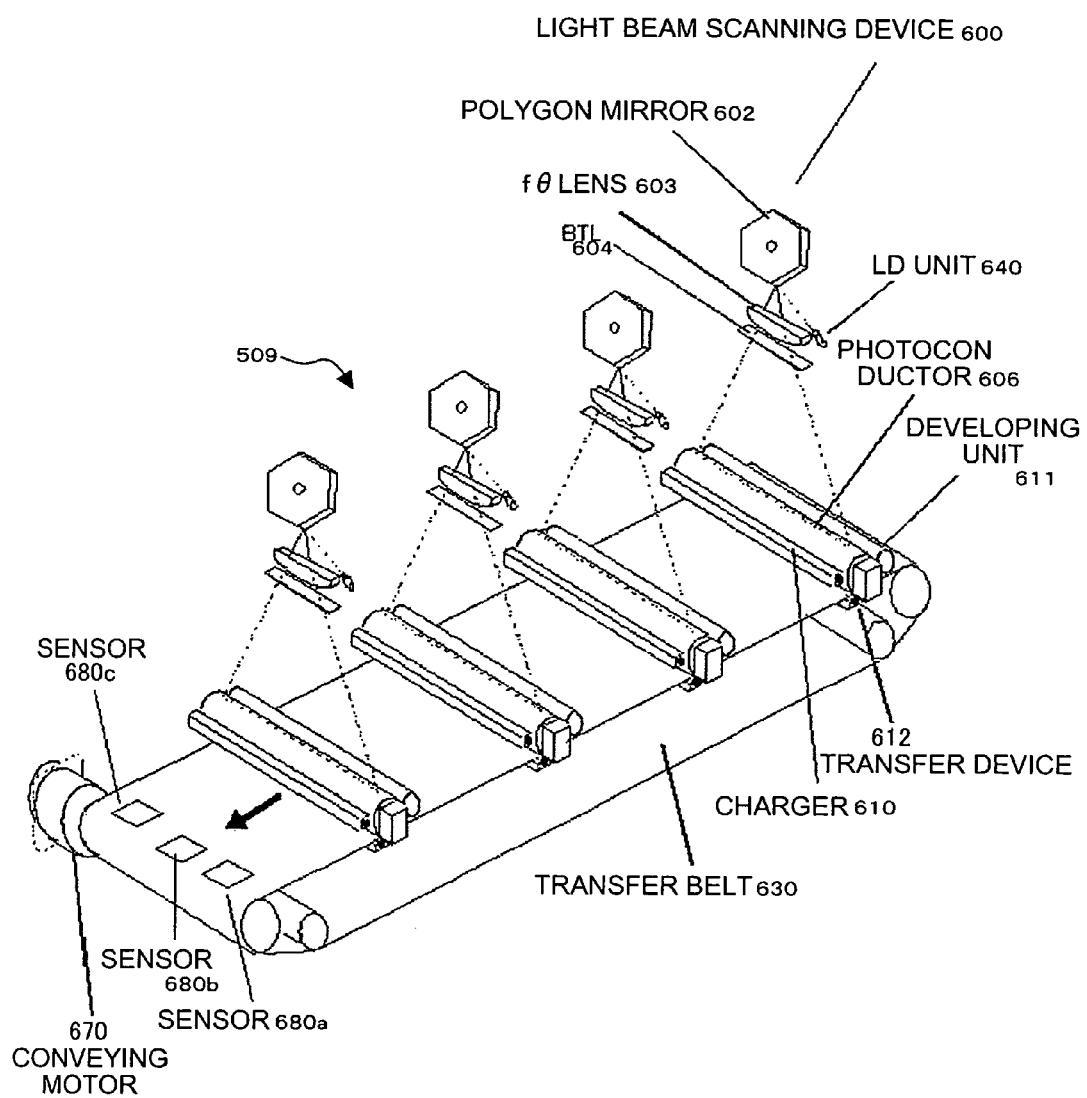
FIG. 15 is a configuration diagram of another image forming unit that performs a four-drum type color image formation according to a fourth embodiment of the present invention.

FIG. 15 depicts another image forming unit 509b that performs a four-drum type color image formation. The image forming unit 509b in the fourth embodiment is different from the image forming unit 509a according to the third embodiment shown in FIG. 14 in that the image forming unit 509a includes sensors 680a, 680b, and 680c that detect a pattern for image position correction.

Therefore, an image position can be corrected from the detection result of the sensor 680a, a magnification of a left half of the image can be corrected from the detection results of the sensors 680a and 680b, and a magnification of a right half of the image can be corrected from the detection results of the sensors 680b and 680c.

Figure 16:
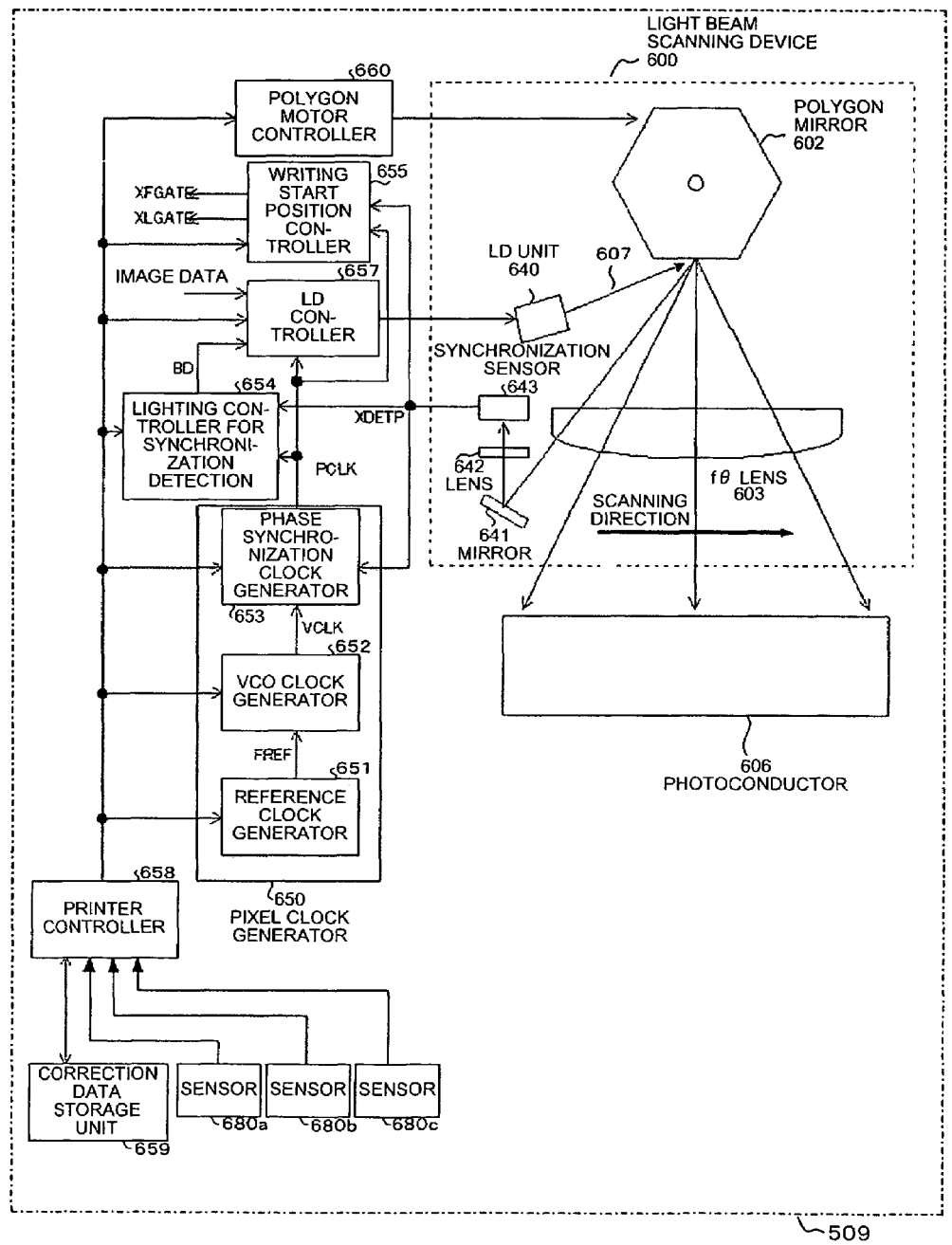
FIG. 16 is a configuration diagram of an image formation controller and a light beam scanning device in the image forming unit.

FIG. 16 is a configuration diagram of the image formation controller and the light beam scanning device 600 in the image forming unit 509b. The configuration shown in FIG. 16 is different from the configuration according to the first embodiment shown in FIG. 4 in that the configuration shown in FIG. 16 includes the sensors 680a, 680b, and 680c that detect an image pattern instead of the light beam detecting sensors 608a, 608b, and 608c.

Information about the detection result of an image pattern obtained by the sensors 680a, 680b, and 680c is fed to the printer controller 658, and the printer controller 658 generates correction data based on the information about the detection result to store the data in the correction data storage unit 659.

Setting of correction areas can be performed similarly to the first embodiment.

Figure 17:
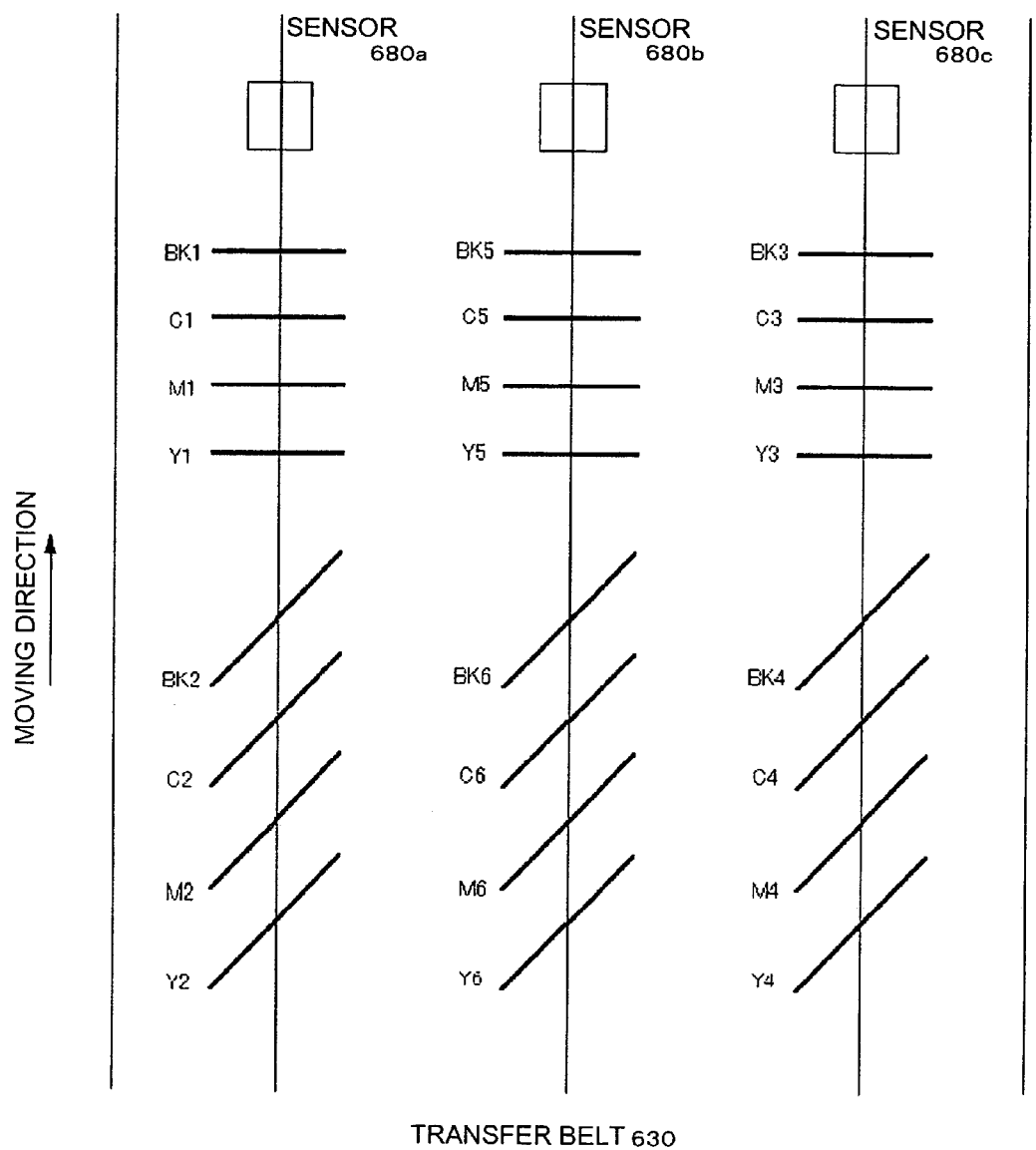
FIG. 17 depicts patterns for image position correction to be formed on a transfer belt.

FIG. 17 depicts patterns for image position correction formed on the transfer belt 630.

Transverse line images and oblique line images with respective colors are formed on the transfer belt 630 at predetermined timings. The transfer belt moves in the direction of arrow and the respective color transverse line images and the respective color oblique line images are detected by the sensors 680a, 680b, and 680c including light emitting elements and light receiving elements that read reflected light from the light emitting elements. The detection results are fed to the printer controller 658, and a deviation amount (time) of each color from a reference color, BK, is calculated. The detection timings of the oblique line images change due to deviation of the image position and the image magnification in the main scanning direction, while the detection timings of the transverse line images change due to deviation of the image position in the sub-scanning direction.

Specifically, regarding the image position in the main scanning direction, a time period from a pattern BK1 to a pattern BK2 is set as a reference time period, and a time period from a pattern C1 to a pattern C2 is compared with the reference time period. Since a deviation amount TBKC 12 between both the time periods is an image deviation of the cyan image to the back image in the main scanning direction, any one of a change in a timing of the XLGATE signal for determining a writing start timing and a shift in the phase of the pixel clock or both is performed corresponding to the deviation amount. A similar process is applied to the magenta image and the yellow image.

Regarding a magnification of a left half of the image in the main scanning direction, a time period from the pattern BK1 to the pattern BK2 is set as a reference time period, the time period from the pattern C1 to the pattern C2 is compared with the reference time period, and the deviation amount TBKC12 between both the time periods is obtained. A time period from a pattern BK5 to a pattern BK6 is set as a reference time period, a time period from a pattern C5 to a pattern C6 is compared with the reference time period, and a deviation amount TBKC56 between both the time periods is obtained. A difference 'TBKC56−TBKC12' indicates a magnification error of a left half of a cyan image to a black image, and the phase of the pixel clock PCLK is shifted by an amount corresponding to the magnification error. Regarding a magnification of a right half of the image in the main scanning direction, the time period from the pattern BK5 to the pattern BK6 is set as a reference time period, the time period from the pattern C5 to the pattern C6 is compared with the reference time period, and the deviation amount TBKC 56 between both the time periods is obtained. A time period from a pattern BK3 to a pattern BK4 is set as a reference time period, a time period from a pattern C3 to a pattern C4 is compared with the reference time period, and a deviation amount TBKC34 between both the time periods is obtained. A difference 'TBKC34−TBKC56' indicates a magnification error of a right half of a cyan image to a black image, and the phase of the pixel clock PCLK is shifted by an amount corresponding to the magnification error. A similar process is applied to the magenta image and the yellow image.

A method for shifting a phase based on the detected error is similar to that in the first embodiment.

Figure 18:
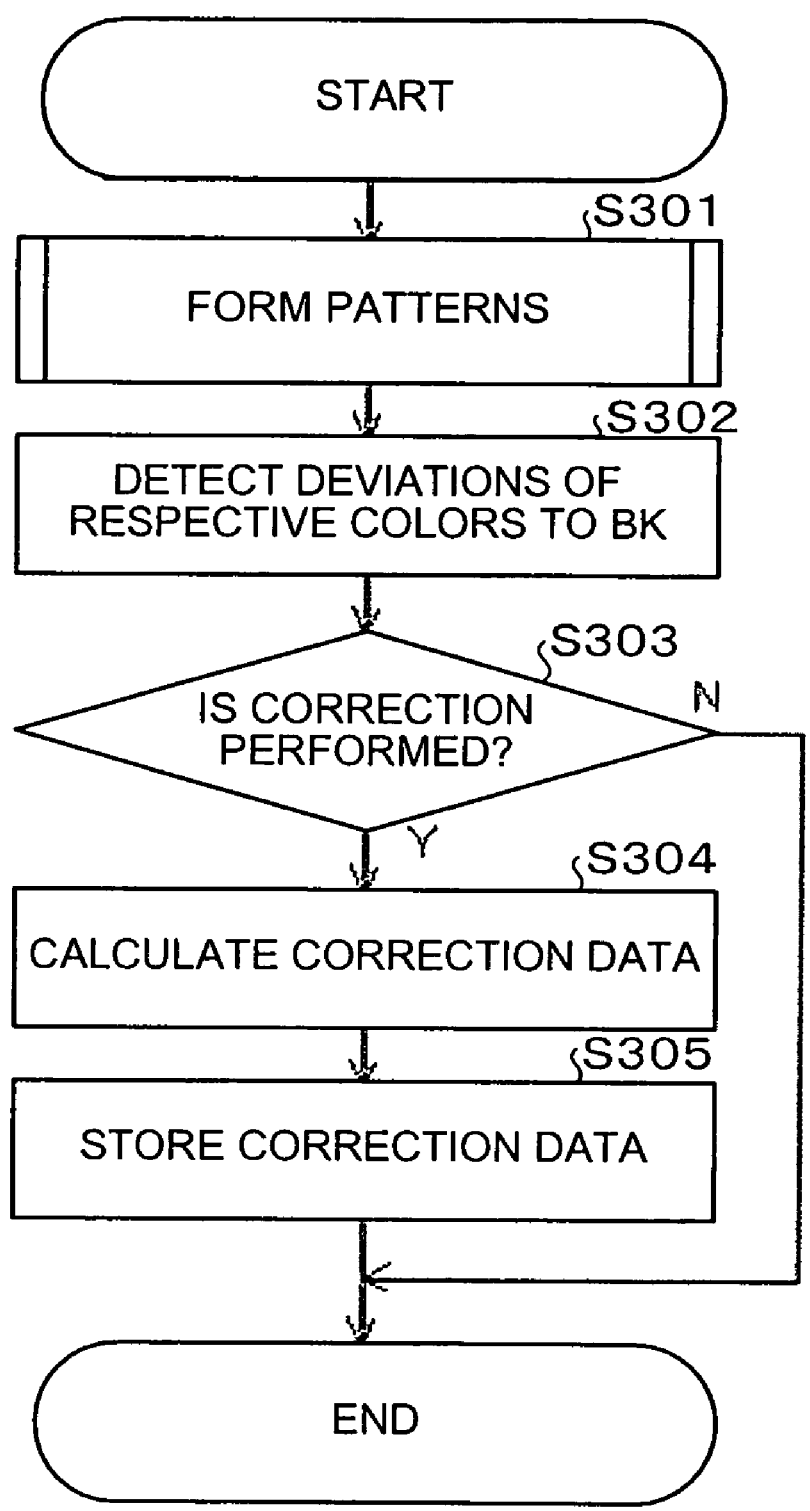
FIG. 18 is a flowchart of an image position and image magnification correcting procedure.

FIG. 18 depicts an image position and image magnification correcting procedure in the fourth embodiment.

In FIG. 18, first, a correction pattern shown in FIG. 17 is formed (step S301), deviation amounts of respective colors to a color BK are detected by the sensors 680a, 680b, and 680c (step S302). Whether the correction should be made is determined from the deviation amounts, and when it is determination that the deviation amounts are smaller than reference values and no correction is required (determination step S303: No), the process step S is terminated. When it is determined that correction is required (determination step S303: Yes), correction data is calculated (step S304), and the correction value is stored in the correction data storage unit 659 (step S305). Image is formation is performed using the correction data at a time of image forming operation performed thereafter.

It is determined at S303 that the correction should be performed when the detected deviation amount is a half of a correction resolution or more, while it is determined that correction is unnecessary when the detected deviation amount is less than a half of the correction resolution.

A fifth embodiment of the present invention will be explained next.

The configuration and the operation of the image forming unit 509b are similar to those in the fourth embodiment shown in FIGS. 15 to 17.

Figure 19:
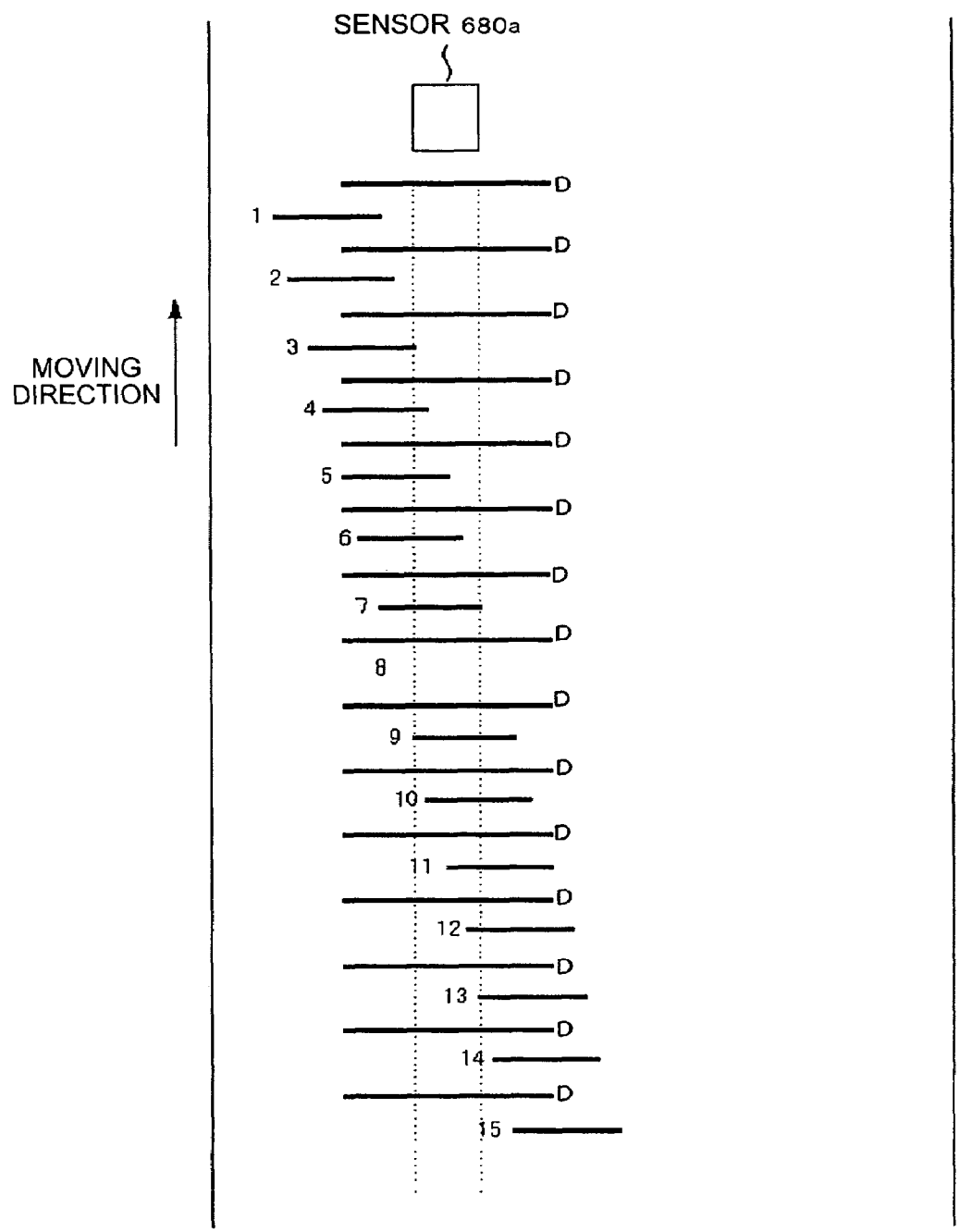
FIG. 19 depicts patterns for area boundary setting according to a fifth embodiment of the present invention.

FIG. 19 depicts patterns for area boundary setting. In FIG. 19, although only patterns to be detected by the sensor 608a are shown, similar patterns are formed according to the sensors 608b and 608c.

Patterns whose writing start timings are shifted in the main scanning direction are formed and the patterns are detected by a sensor. In the embodiment, although fifteen kinds of patterns are included, the number of patterns is not limited to fifteen. The patterns are formed to include any pattern that cannot be detected by a sensor, and intervals among the patterns to be changed can be determined based on a setting accuracy for areas. When high accuracy is not required, the intervals can be set to be coarse. Since positions where patterns are formed are controlled by a counter that operates according to pixel clocks PCLK, a writing start position and a writing termination position of each pattern are managed by the printer controller 658.

Assuming that the sensor 608a used for detection conducts detection with a predetermined width (a range defined by two dotted lines), it detects the patterns 4 to 12, so that an intermediate portion between the termination position of the pattern 4 and the start position of the pattern 12 corresponds to a position (a central portion) of the sensor 680a. The obtained values are stored in the correction data storage unit 659 as area boundary setting values, so as to be used for image forming operation conducted thereafter.

To determine a pattern where the detection has started, patterns (dummy patterns D) that are detected reliably are formed before respective patterns, and determination is made by checking intervals (time periods) of pattern detection. In the embodiment, since the detection intervals become short after detection of a fourth dummy pattern, it is determined that the pattern 4 and patterns subsequent thereto can be detected.

In the embodiment, although transverse line patterns having the same shape as the patterns for image position correction are used, a shape thereof is not limited to the shape in this shape.

The patterns for image position correction shown in FIG. 17 are utilized as one set, a plurality of the sets where writing start timings of the patterns are shifted are used, and dummy patterns can be individually formed between adjacent patterns.

When sensor positions change due to replacement thereof, it is necessary to examine the set values for the areas again. However, for example, by conducting the control for each power-on time or for each predetermined period, a state at a replacement time and change over time can be accepted.

A sixth embodiment of the present invention will be explained next.

The sixth embodiment is a modification of the fourth embodiment shown in FIGS. 15 to 17.

The patterns for image position deviation correction shown in FIG. 17 are formed on the transfer belt 630 or the recording paper 620 placed on the transfer belt 630.

In both cases, transverse line images and oblique line images are formed for respective colors at predetermined timings. The transverse line images and the oblique line images for respective colors are detected by the sensors 680a, 680b, and 680c according to movement of the transfer belt 630 (the recording paper 620) in a direction of arrow, the detection results are fed to the printer controller 658, and deviation amounts (time periods) of respective colors to the color BK are calculated. The detection timings for the oblique line images change due to deviations of the image position and the image magnification in the main scanning direction, while the detection timings for the transverse line images change due to deviation of the image position in the sub-scanning direction.

Specifically, regarding the image position in the main scanning direction, a time period from a pattern BK1 to a pattern BK2 is set as a reference time period, and a time period from a pattern C1 to a pattern C2 is compared with the reference time period. Since a deviation amount TBKC 12 between the both time periods is an image deviation of the cyan image to the back image in the main scanning direction, any one of a change in a timing of the XLGATE signal for determining a writing start timing and a shift in the phase of the pixel clock or both corresponding to the deviation amount is performed. A similar process is applied to the magenta image and the yellow image.

Regarding a magnification of a left half of the image in the main scanning direction, a time period from the pattern BK1 to the pattern BK2 is set as a reference time period, the time period from the pattern C1 to the pattern C2 is compared with the reference time period, and the deviation amount TBKC12 between the both time periods is obtained. A time period from a pattern BK5 to a pattern BK6 is set as a reference time period, a time period from a pattern C5 to a pattern C6 is compared with the reference time period, and a deviation amount TBKC56 between both the periods is obtained. A difference 'TBKC56−TBKC12' indicates a magnification error of a left half of a cyan image to a black image, and the frequency (phase) of the pixel clock PCLK is changed by an amount corresponding to the magnification error. Regarding a magnification of a right half of the image in the main scanning direction, the time period from the pattern BK5 to the pattern BK6 is set as a reference time period, the time period from the pattern C5 to the pattern C6 is compared with the reference time period, and the deviation amount TBKC 56 between both the periods is obtained. A time period from a pattern BK3 to a pattern BK4 is set as a reference time period, a time period from a pattern C3 to a pattern C4 is compared with the reference time period, and a deviation amount TBKC34 between both the periods is obtained. A difference 'TBKC34–TBKC56' indicates a magnification error of a right half of a cyan image to a black image, and the frequency (phase) of the pixel clock PCLK is changed by an amount corresponding to the magnification error. A similar process is applied to the magenta image and the yellow image.

Regarding the sub-scanning direction, time differences of transverse lines of respective colors to the transverse line of the color BK are compared with the reference values (target time differences), and a timing of XFGATE signals for determining the writing start timing is changed by a deviation amount corresponding to differences between the time differences and the reference values. In the embodiment, since detection is made at three points, the deviation amount is an average value of values obtained at the three points.

Figure 20:
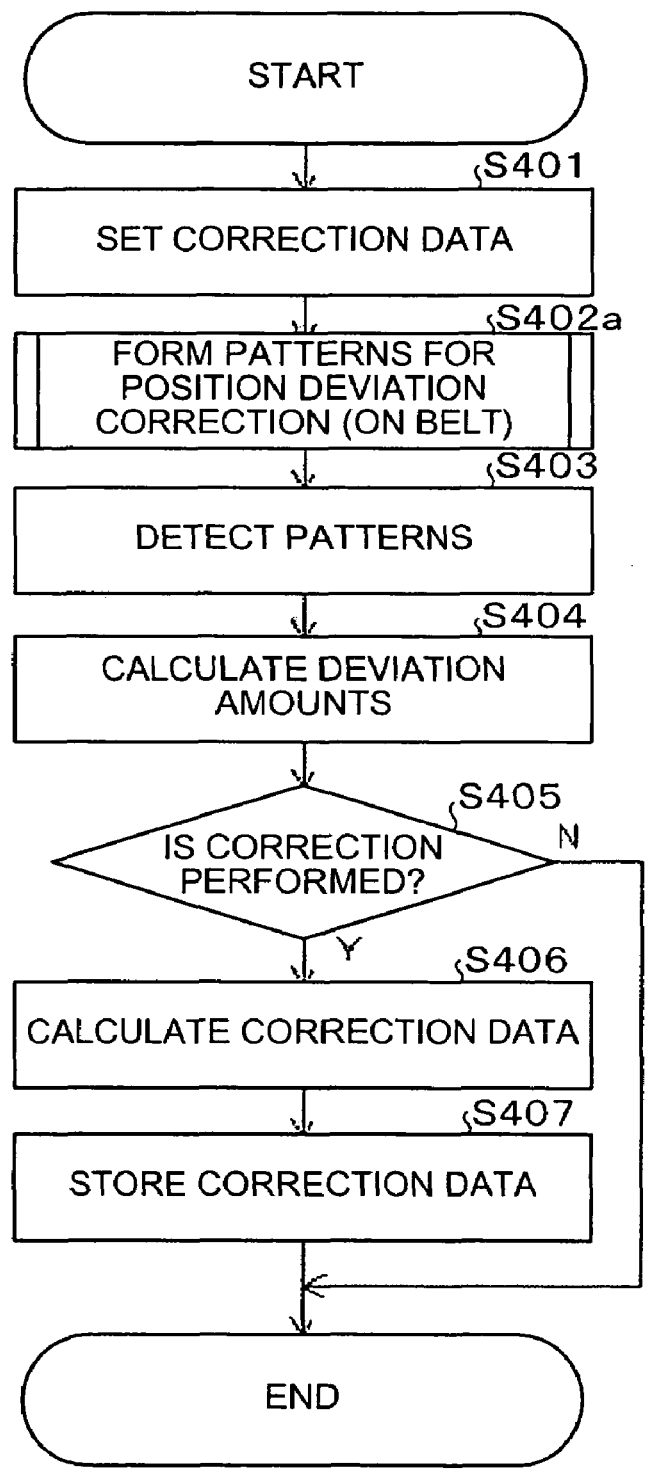
FIG. 20 is a flowchart of an image position and image magnification correcting procedure when the patterns shown in FIG. 17 are formed on the transfer belt.

FIG. 20 depicts an image position and image magnification correcting procedure when the patterns shown in FIG. 17 are formed on the transfer belt 630.

Figure 21:
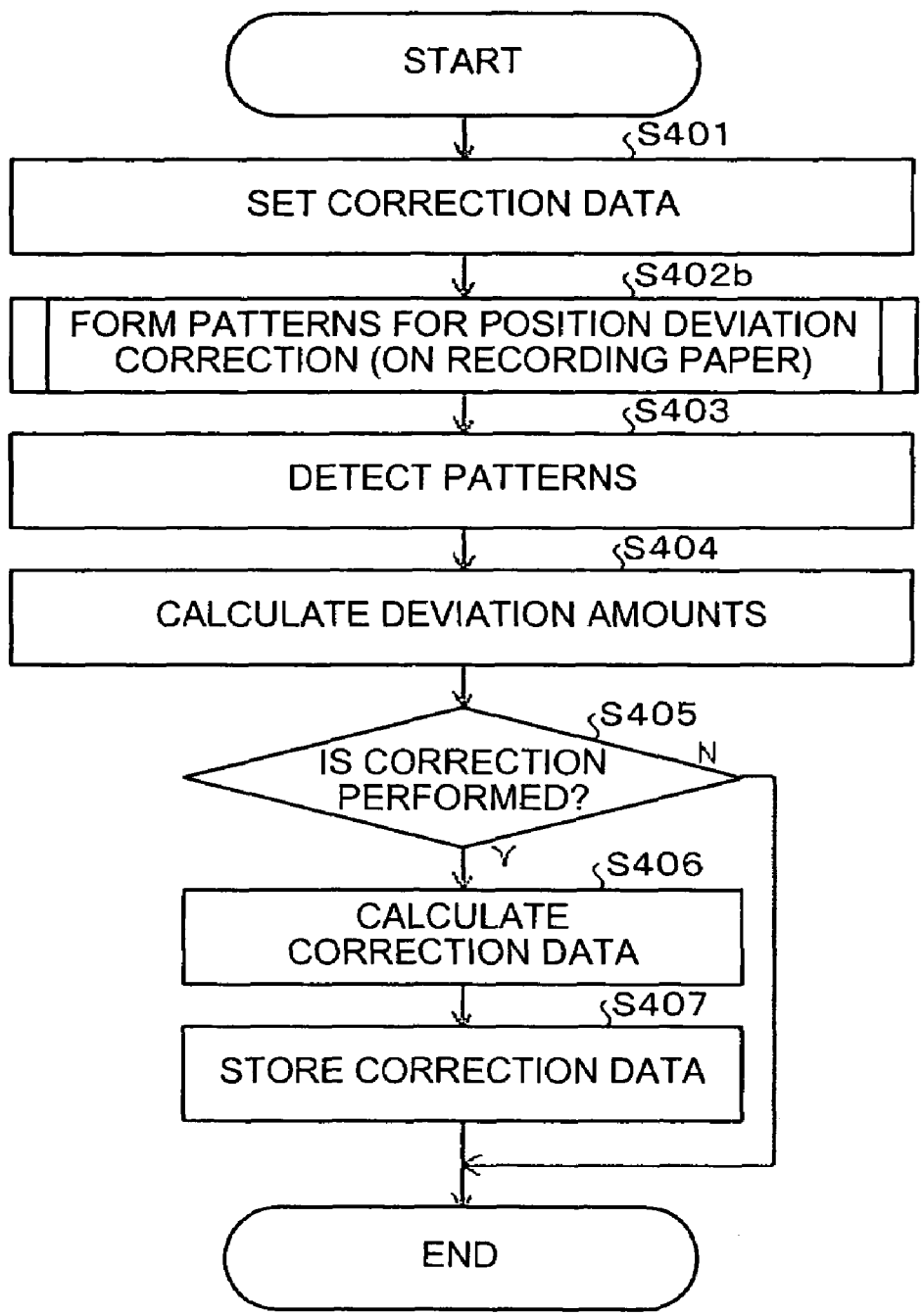
FIG. 21 is a flowchart of an image position and image magnification correcting procedure when the patterns shown in FIG. 17 are formed on a recording paper.

FIG. 21 depicts an image position and image magnification correcting procedure when the patterns shown in FIG. 17 are formed on the recording paper 620.

In FIG. 20, the correction data for respective colors stored in the correction data storage unit 659 is set in respective controllers (step S401). The correction data to be set is the correction data previously obtained from the correction operation according to the procedure shown in FIG. 20 or FIG. 21, or it is initial values (preset default values) if correction has not been conducted yet).

After the setting, the patterns for position deviation correction shown in FIG. 17 are formed on the transfer belt 630 (step S402a), the patterns are detected by the sensors 680a, 680b, and 680c (step S403), and deviation amounts of respective colors to the color BK are calculated in the printer controller 659 (step S404). Whether correction should be made is determined (step S405). It is determined that correction should be performed when the deviation amount is a half of a correction resolution or more.

When it is determined at step S405 that correction is made (determination step S405: Yes), correction data is calculated (step S406), and the calculated correction data is stored (step S407). In this case, only the correction data obtained according to the correction operation shown in FIG. 20 is updated. When it is determined at S405 that correction is not required (determination step S405: No), the correction data is not updated.

The procedure shown in FIG. 21 is different from that shown in FIG. 20 only in that the step S402a is replaced with a step S402b. That is, in the procedure shown in FIG. 21, the patterns for position deviation correction are not formed on the transfer belt 630 but on the recording paper 620 placed on the transfer belt. In the procedure shown in FIG. 21, the recording paper 620 for pattern formation is fed and pattern formation is made on the fed recording paper.

When the procedure shown in FIG. 20 is applied as the correction operation, correction operation is automatically performed at predetermined intervals, however, when the procedure shown in FIG. 21 is applied as the correction operation, correction operation is performed according to an instruction from an external input device, for example, the operation display unit 507.

In FIG. 21, the correction data for respective colors stored in the correction data storage unit 659 is set to respective controllers (step S401), and the correction data to be set is data obtained by adding the correction data previously obtained according to the correction operation shown in FIG. 20 and the correction data previously obtained according to the correction operation shown in FIG. 21. Alternatively, if correction has not been conducted yet, the correction data will be initial values (preset default values).

After the setting, patterns for position deviation correction are formed on the recording paper 620 (step S402b), the patterns are detected by the sensors 680a, 680b, and 680c (step S403), and deviation amounts of respective colors to black are calculated in the printer controller 658. Whether correction should be made is determined (step S405). It is determined that correction should be made when the deviation amount is a half of the correction resolution or more. When the correction is made (determination step S405: Yes), correction data is calculated to be stored (step S407). In this case, only correction data obtained according to the correction operation shown in FIG. 21 is updated. When correction is not made based on determination at step S405 (determination step S405: No), the correction data is not updated.

When the image forming operation subsequent thereto, operations for position deviation corrections shown in FIGS. 20 and 21, and the like are conducted, two kinds of correction data about the respective procedures shown in FIGS. 20 and 21 stored in the correction data storage unit 659 are added with each other and the added correction data is set to respective controllers, thereby forming an image.

When the frequencies (phases) of the pixel clocks are changed within the image region, if it is continuously changed, the image position and the image magnification are concentrically changed in a region corresponding to the changed pixel clocks. Therefore, it is desirable to distribute the pixels whose phases should be changed, evenly in the area.

When sensor mounting positions are changed, boundaries among the respective areas are changed. Values about changed boundaries are also stored in the correction data storage unit 659. By changing the areas, the main scanning position of the patterns for image position deviation correction are also changed. On the contrary, when using patterns for image position deviation correction different in position in the main scanning direction from one previously used, boundaries for respective areas must be changed.

When the number of sensors is increased, the boundaries as well as the number of areas must be changed. When five sensors are used, five set values are required for the synchronization detecting sensor 643. The set values must be stored in the correction data storage unit.

When the light beam scanning device or each sensor is replaced with another one, a sensor position or a boundary position for areas may be changed. Therefore, it is desirable to reset a boundary for areas or reset a main scanning position of a pattern for image position deviation correction.

In the embodiment, although three patterns are formed in the main scanning direction, the number of the patterns is not limited to three. The magnification error in the main scanning direction is reduced more significantly according to increase in the number of patterns or sensors, which is desirable.

Regarding the sub-scanning direction, although one set of transverse and oblique lines are formed as an example, the present invention is not limited to this example. The detection error can be reduced largely by forming plural sets of transverse and oblique lines and averaging values obtained therefrom to determine the deviation amount, which is desirable.

A seventh embodiment of the present invention will be explained next.

Figure 22:
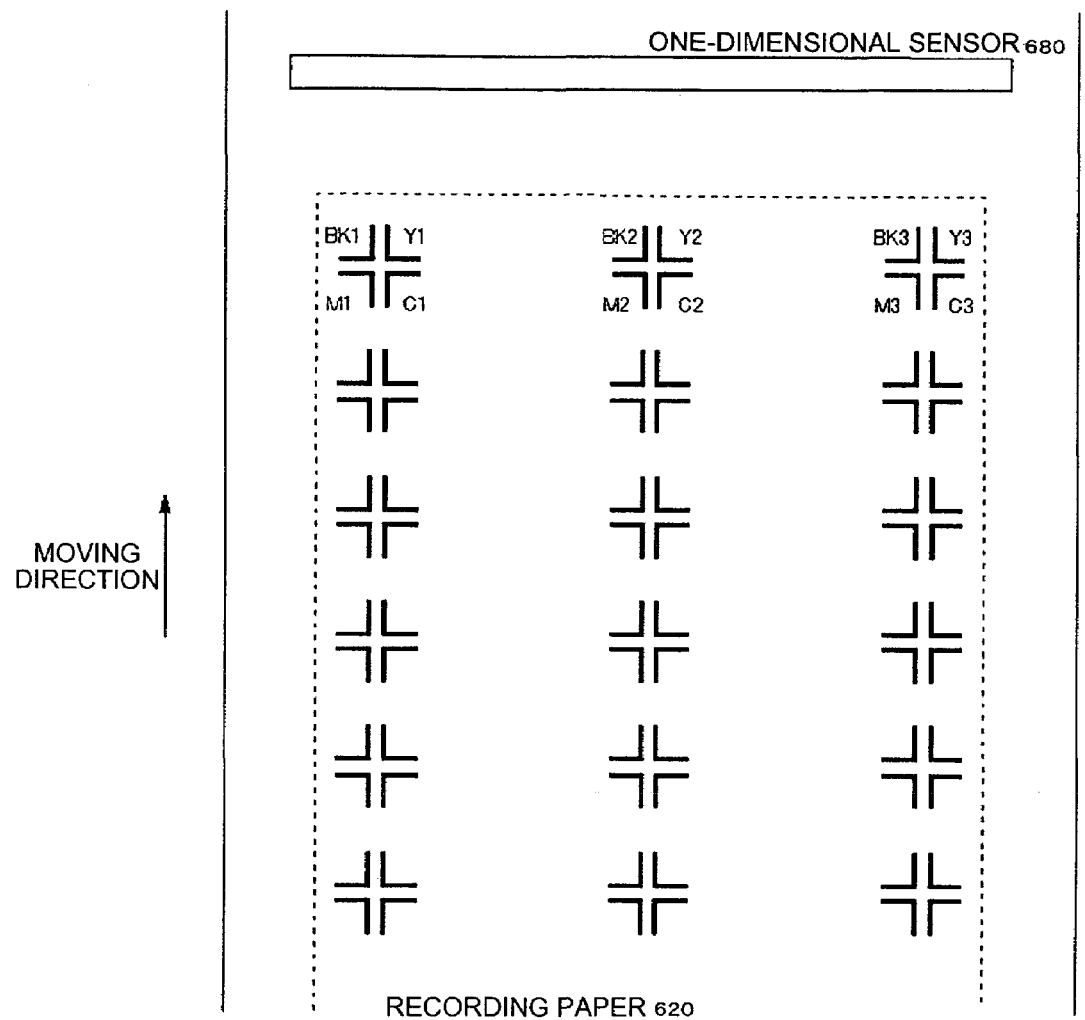
FIG. 22 depicts patterns for position deviation correction according to a seventh embodiment of the present invention, which are different from the patterns for image position deviation correction shown in FIG. 17.

The seventh embodiment is different from the sixth embodiment in that in the seventh embodiment, a position deviation amount is detected using patterns shown in FIG. 22 different from the patterns for position deviation correction shown in FIG. 17. Other operations are the same as those according to the sixth embodiment.

The patterns for image position deviation correction shown in FIG. 22 are detected by a one-dimensional sensor 680 (alternatively, a two-dimensional sensor can be used) instead of the sensors 680a, 680b, and 680c in the sixth embodiment.

Regarding respective colors, deviation amounts thereof in the main scanning direction and the sub-scanning direction can be detected by forming patterns for image position deviation correction (L-shaped patterns), as described with reference to FIG. 22. A pattern interval for each color is determined in advance, and an actual interval (detected interval) is detected for each color, so that the predetermined interval and the actual interval are compared with each other and correction is made by an amount corresponding to a deviation amount therebetween in the printer controller 658. In the embodiment, since a plurality of patterns in the sub-scanning direction are prepared, correction is performed using an average value of deviation amounts for each color.

Specifically, for the image position in the main scanning direction, an actually measured distance between a vertical line portion of a pattern BK1 and a vertical line portion of a pattern C1 and a set distance therebetween are compared with each other. A difference between the actually measured distance and the set distance indicates an image deviation of a cyan image to a black image. Therefore, any one of a change in a timing of the XLGATE signal for determining a writing start timing and a shift in the frequency (phase) of the pixel clock or both is performed corresponding to the deviation amount. A similar process is applied to the magenta image and the yellow image.

Regarding a magnification of a left half of the image in the main scanning direction, a difference between the actually measured distance between the vertical line portion of the pattern BK1 and the vertical line portion of the pattern C1 and the set distance therebetween, and a difference between an actually measured distance between a vertical line portion of a pattern BK2 and a vertical line portion of a pattern C2 and a set distance therebetween are obtained, and the difference between both the differences corresponds to a magnification error of a left half of the cyan image to the black image, so that the frequency (phase) of the pixel clock PCLK is changed by an amount corresponding to the difference.

Regarding a magnification of a right half of the image in the main scanning direction, a difference between an actually measured distance between a vertical line portion of a pattern BK2 and a vertical line portion of a pattern C2 and a set distance therebetween and a difference between an actually measured distance between a vertical line portion of a pattern BK3 and a vertical line portion of a pattern C3 and a set distance therebetween are obtained, and the difference between both the differences corresponds to a magnification error on a right half of the cyan image to the black image, so that the frequency (phase) of the pixel clock PCLK is changed by an amount corresponding to the difference. A similar process is applied to the magenta image and the yellow image.

Regarding the sub-scanning direction, an interval between transverse lines is examined, and if there is a deviation, the timing of the XFGATE signal for determining the writing start timing is changed as much as the deviation amount. In the embodiment, since detection is conducted at three points in the main scanning direction, all patterns in the main scanning direction and the sub-scanning direction are measured, and an average value is preferably used.

An eighth embodiment of the present invention will be explained next.

Figure 23:
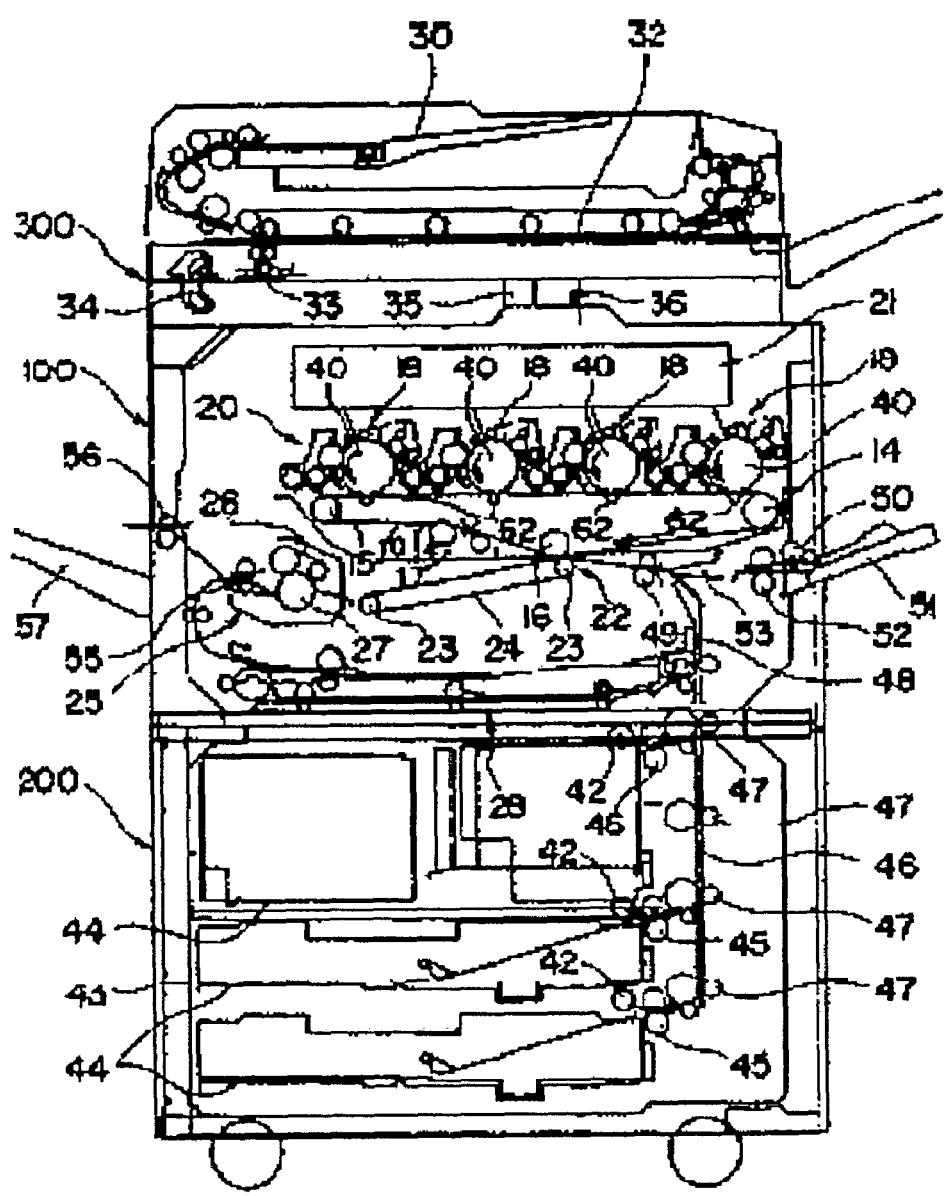
FIG. 23 is a schematic diagram of a mechanical unit of an image forming apparatus according to an eighth embodiment of the present invention.

FIG. 23 is a schematic diagram of a mechanical unit of the image forming apparatus 500 according to the eighth embodiment.

An intermediate transfer unit is provided at a central portion of a printer 100 corresponding to the image forming unit 509 in the image forming apparatus 500, and an intermediate transfer belt 10 which is an endless belt is disposed in the intermediate transfer unit. The intermediate transfer belt 10 is a multi-layer belt that includes, for example, a base layer made of a hardly stretchable member such as a canvas coated with hardly stretchable fluorine resin or easily stretchable rubber material and an elastic layer provided thereon. The elastic layer is a smooth coat layer formed by coating fluorine resin or the like on a surface of, for example, a fluorine rubber or acrylonitorile-butadiene copolymer rubber. The intermediate transfer belt 10 is spanned around three support rollers 14 to 16, and it is rotationally driven in a clockwise direction.

An intermediate transfer member cleaning unit 17 that removes residual toner on the intermediate transfer belt 10 after image transfer is disposed on the left side of a second support roller 15. An imaging device 20 including a photoconductor unit 40, a charger unit 18, a developing unit, and a cleaning unit for each color of black (K), yellow (Y), magenta (M), and cyan (C) is arranged above a portion of the intermediate transfer belt 10 positioned between the first support roller 14 and the second support roller 15 along a direction of movement of the intermediate transfer belt 10, and the imaging device 20 is attachably and detachably mounted on a printer main unit. A writing unit 21 that irradiates a laser light for image forming on each photosensitive drum in each photoconductor unit is disposed above the imaging device 20.

A secondary transfer unit 22 is provided below the intermediate transfer belt 10. The secondary transfer unit 22 includes a secondary transfer belt 24 which is an endless belt and is spanned about two rollers 23 to push up the intermediate transfer belt 10 to bring the secondary transfer unit in pressure contact with the third support roller 16. The secondary transfer belt 24 transfers an image on the intermediate transfer belt 10 to a sheet of paper. A fusing unit 25 that fuses a transferred image on the sheet is disposed beside the secondary transfer device 22, and a sheet with a transferred toner image is fed into the fusing unit 25. The fusing unit 25 includes a fusing belt 26 which is an endless belt and a heating and pressurizing roller 27 is brought in pressure contact with the fusing belt 26. A sheet reversing unit 28 that reverses a sheet with an obverse side just formed with an image to also record an image on a reverse side, is disposed below the second transfer unit 22 and the fusing unit 25.

When a start switch on the operation display unit 507 is pushed, if a document is placed on a document feeding tray 30 of an automatic document feeder (ADF) 40, it is fed to a contact glass 32. When there is no document in the ADF, a scanner of an image reading unit 300 is driven to read a document manually placed on the contact glass 32, and a first carriage 33 and a second carriage 34 are scanning-driven for image reading. Light is emitted from a light source on the first carriage 33 toward the contact glass and reflected light from a surface of the document is reflected by a first mirror on the first carriage 33 to be directed to the second carriage 34. The light directed to the second carriage 34 is reflected by the mirror on the second carriage 34 to pass through an imaging lens 35, and it is imaged on a CCD 36 which is a reading sensor. Recording data of respective colors of K, Y, M, and C is generated based on the image signal obtained by the reading sensor 36.

When the start switch is pushed, if image output is instructed from a personal computer or the like, or if output is instructed from a facsimile machine (FAX), rotational drive of the intermediate transfer belt 10 is started, imaging preparations of the respective units in the imaging device 20 are started, imaging sequences for respective color imaging are started, exposing laser beams modulated based on recording data for respective colors are projected on the photosensitive drums for the respective colors, and respective color toner images are superimposition-transferred on the intermediate transfer belt 10 as one toner image through an imaging process. A sheet is fed into the secondary transfer unit 22 at a timing that the leading edge of the sheet advances into the secondary transfer unit 22 simultaneously with advancing of a leading edge of the toner image into the secondary transfer unit 22, so that the toner image on the intermediate transfer belt 10 is transferred on the sheet. The sheet with the transferred toner image is fed into the fusing unit 25, where the toner image is fused on the sheet.

The sheet is fed into the secondary transfer unit 22 at the above timing by selecting and rotationally driving one of paper feed rollers 42 of a paper feed table 200, feeding sheets from one of paper feed trays 44 provided in a paper feed unit 43 in a multi-stage, separating them to individual sheets by a separation roller 45 to feed each sheet to a conveying roll unit 46, conveying the sheet by a conveying roller 47 to introduce the sheet into a conveying roll unit 48 in the printer 100, causing the sheet to abut on a registration roller 49 of the conveying roll unit 48 to stop the sheet. The sheet can be fed by placing the sheet on a manual feed tray 51. When sheets are placed on the manual feed tray 51, the sheets on the manual feed tray 51 are separated to individual sheets to be drawn into a manual feed path 53 according to rotational drive of a feed roller 50 conducted by the printer 100 so that each sheet is caused to abut on the registration roller 49 to be stopped.

A sheet that is subjected to the fusing process in the fusing unit 25 to be discharged is guided to a discharge roller 56 by a switching claw 55 to be stacked on a paper discharge tray 57. Alternatively, the sheet is guided to the sheet reversing unit 28 by the switching claw 55 where the sheet is revered, the reversed sheet is guided to the transfer position again, an image is formed on a reverse surface of the sheet, and it is discharged on the paper discharge tray 57 by the discharge roller 56.

On the other hand, residual toner remaining on the intermediate transfer belt 10 after image transfer is removed by the intermediate transfer member cleaning unit 17, and the intermediate transfer belt 10 is prepared for the next image formation. The registration roller 49 is generally used in its grounded state. However, it can be applied with a bias voltage for removing paper dust of a sheet. For example, an electrically conductive rubber roller is used to apply a bias. The electrically conductive rubber roller has a diameter of 18 millimeters having a surface coating of electrically conductive nitrile butadiene rubber (NBR) with a thickness of 1 millimeter. An electric resistance is about 109 ohm centimeters in volume resistance of a rubber material. A surface of a sheet that has passed through the registration roller 49 which is applied with bias is slightly charged to minus potential. When an image is transferred from the intermediate transfer belt 10 onto a sheet, therefore, transfer conditions can be changed due to change of the transfer conditions from when a voltage is not applied to the registration roller 49. A voltage of about −800 volts is applied to a toner transfer side (the obverse surface) of the intermediate transfer belt 10, while a voltage of about +200 volts is applied to a reverse side thereof by a transfer roller 62.

Figure 24:
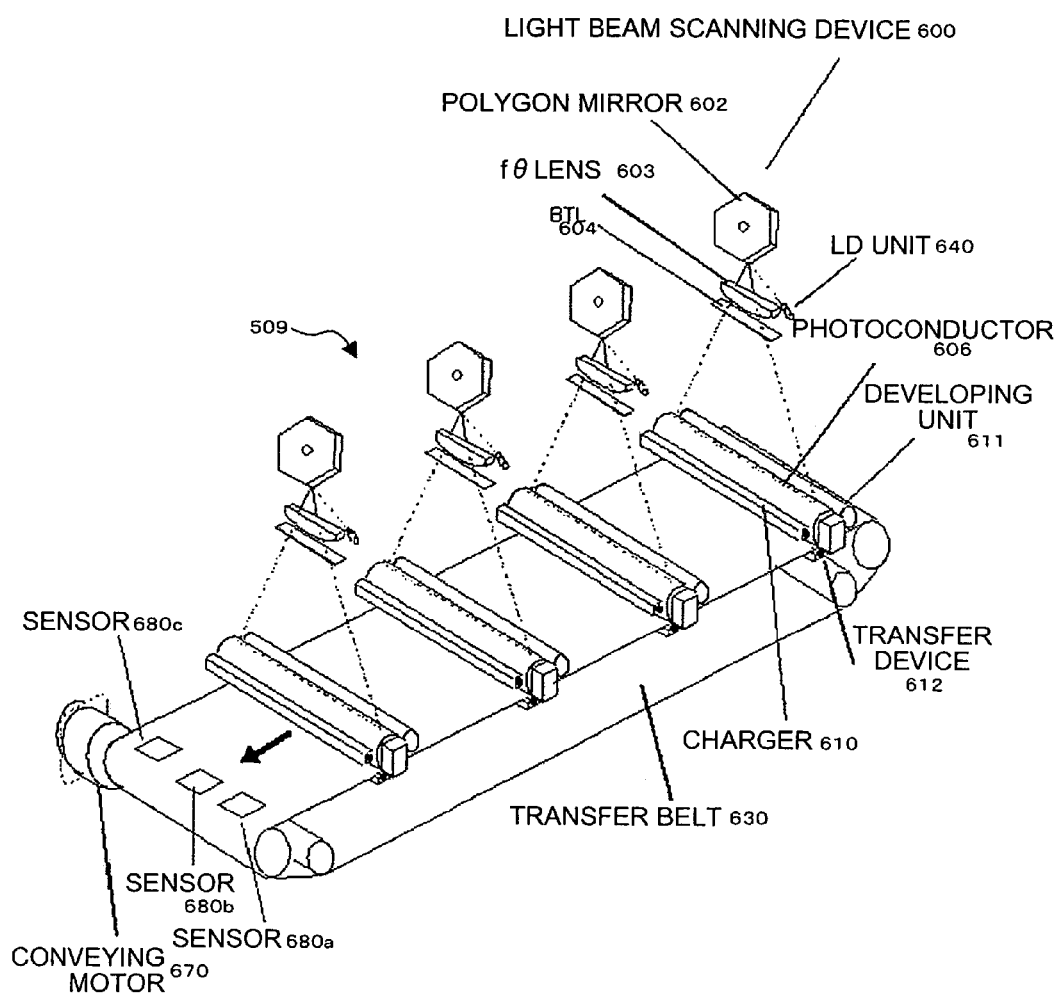
FIG. 24 depicts a light beam scanning device and an image forming unit.

FIG. 24 depicts a light beam scanning device and an image forming unit according to the eighth embodiment (corresponding to a view seen from a rear of the apparatus shown in FIG. 23).

The light beam scanning device and the respective sensors have configurations similar to those shown in FIG. 15. In the embodiment, since an intermediate transfer belt (corresponding to the intermediate transfer belt 10 shown in FIG. 15) is used as the transfer belt 630, the sensors 680*a*, 680*b*, and 680*c* detect only patterns on the transfer belt 630.

Figure 25:
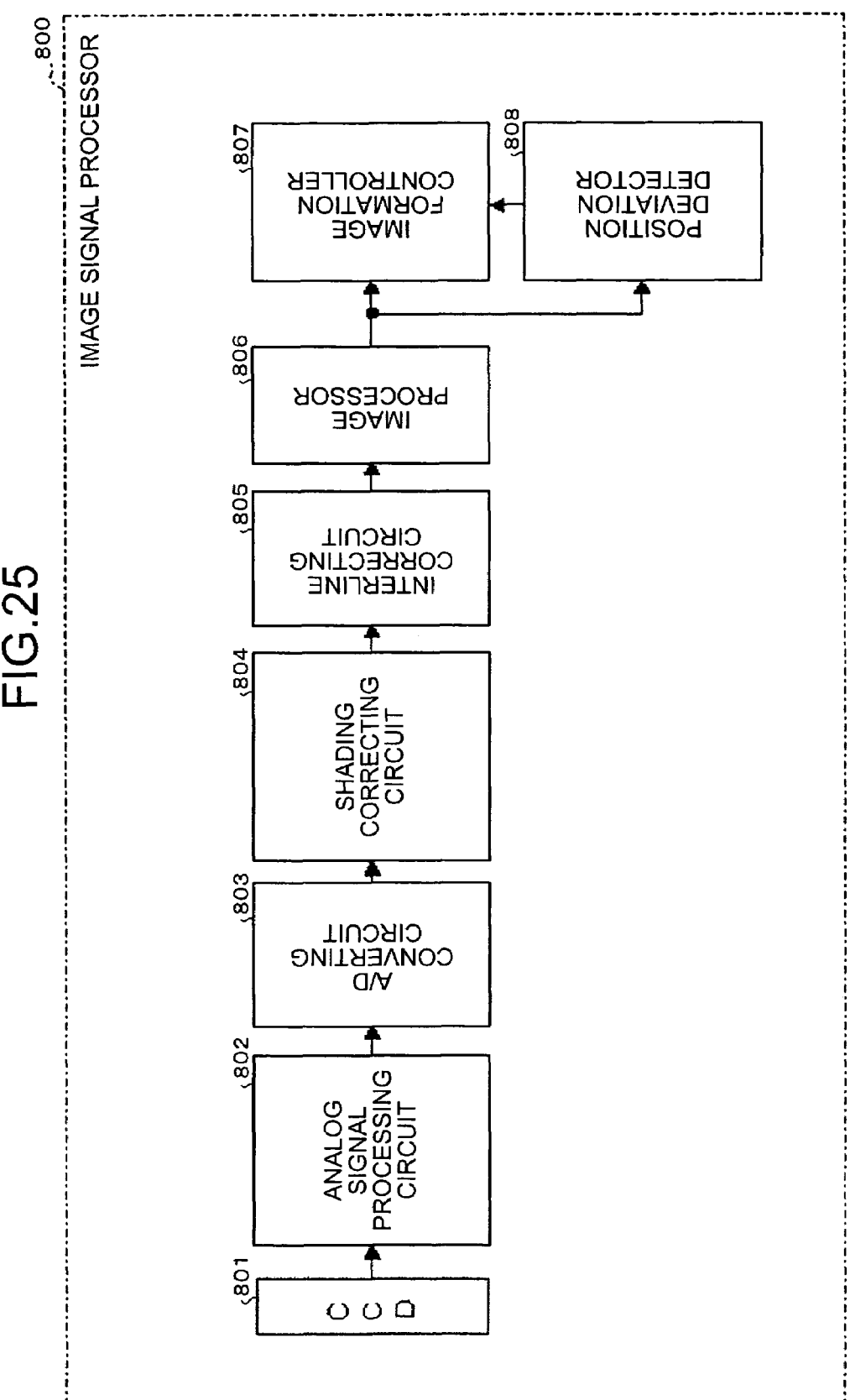
FIG. 25 depicts an image signal processor according to the eighth embodiment.

FIG. 25 depicts an image signal processor 800 according to the eighth embodiment. Image data read by a CCD sensor 801 is subjected to a sample hold processing for converting the data into a continuous analog signal, a black level correction for correcting level fluctuation of dark output of the CCD sensor, and an auto gain control (AGC) for correcting a signal level in an analog signal processing circuit 802.

The output from the analog signal processing circuit 802 is converted to digital data in an A/D converting circuit 803 to be fed to a shading correcting circuit 804. In the shading correcting circuit 804, light source unevenness in a halogen lamp, a difference in transmission light amount between a central portion of a lens and end potions thereof, fluctuation in sensitivity among elements in the CCD sensor, and the like are corrected by multiplying the output from the A/D converting circuit 803 by correction data preliminarily measured by reading of a white reference plate, so that signal level is made even.

An interline correcting circuit 805 corrects RGB line intervals of the CCD sensor 801 in the sub-scanning direction thereof to perform output to an image processor 806 as image data read at the same position.

The image processor 806 performs various processings such as color correction, and gamma correction to feed image data to an image formation controller 807.

The image formation controller 807 corresponds to the configuration shown in FIG. 16, and it controls lighting of laser in response to image data. Laser beam is emitted from the LD unit to be deflected by the polygon mirror to pass through the fθ lens, thereby performing scanning on the photoconductor.

When patterns for image position deviation correction are received from the CCD 801, a signal from the image processor 806 is fed to a position deviation detector 808, where deviation amounts of respective colors to BK are calculated and correction values are obtained similarly to the seventh embodiment. The correction values are fed to the correction data storage unit 659 in the image formation controller 807, so that the correction values are set in respective controllers at an image forming time performed thereafter.

Figure 26:
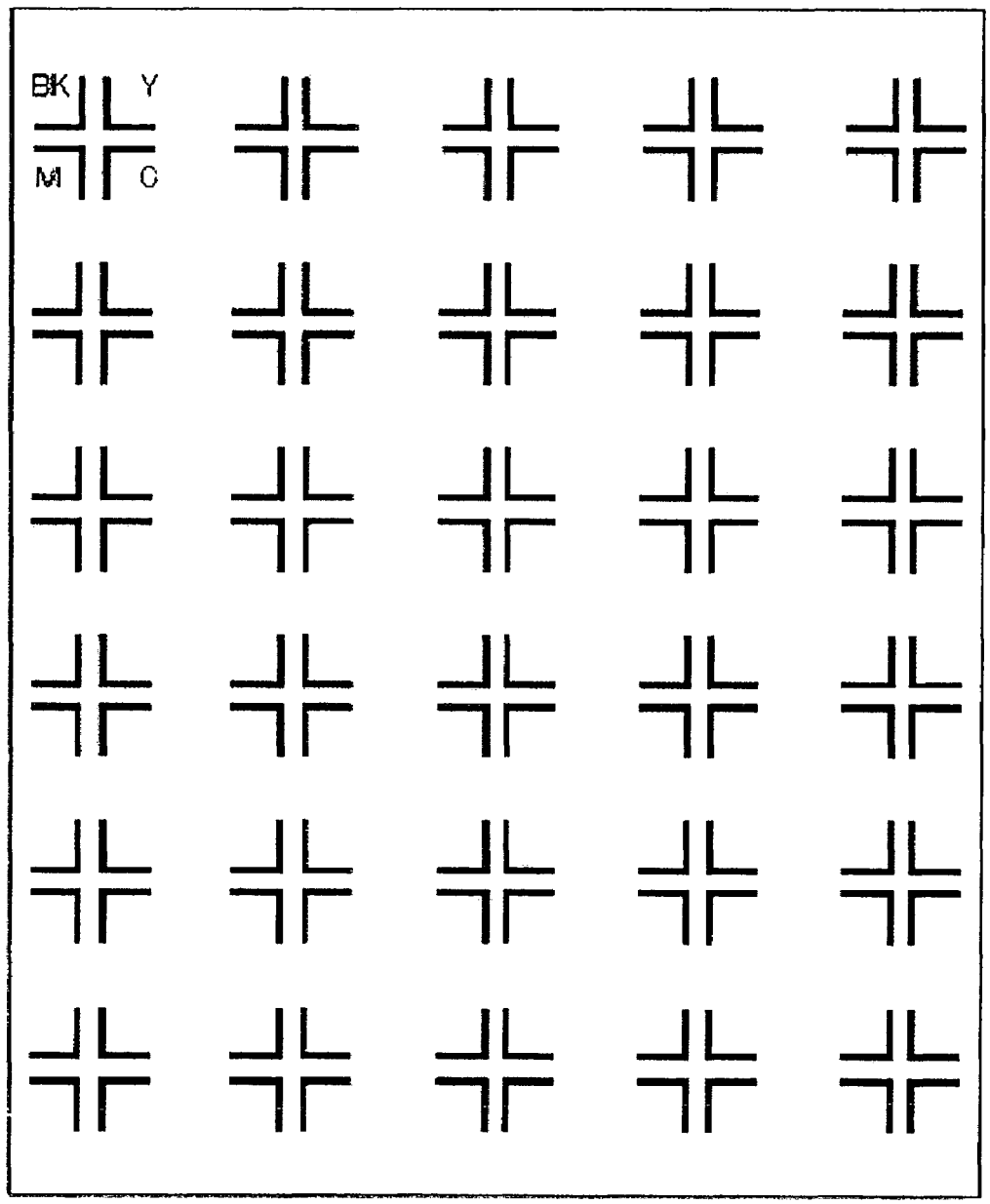
FIG. 26 depicts patterns for image position deviation correction recorded on a recording paper.

FIG. 26 depicts patterns for image position deviation correction according to the embodiment. In the embodiment, patterns shown in FIG. 26 are used when the patterns shown in FIG. 17 and explained in the sixth embodiment or shown in FIG. 22 and explained in the seventh embodiment are formed on the transfer belt 630, correction operation is conducted, and patterns for image position deviation correction are formed on a recording paper 620. The number of the patterns in the main scanning direction used here is more than that of the patterns shown in FIG. 22 because the patterns formed on the recording paper 620 are read by the CCD 801 of the image signal processor 800 shown in FIG. 25 that is included in the image forming apparatus 500 shown in FIG. 23. In this embodiment, the patterns arranged in five lines are used. However, more than five lines can be used for the pattern formation. The deviation amounts are detected similarly to the seventh embodiment.

Figure 27:
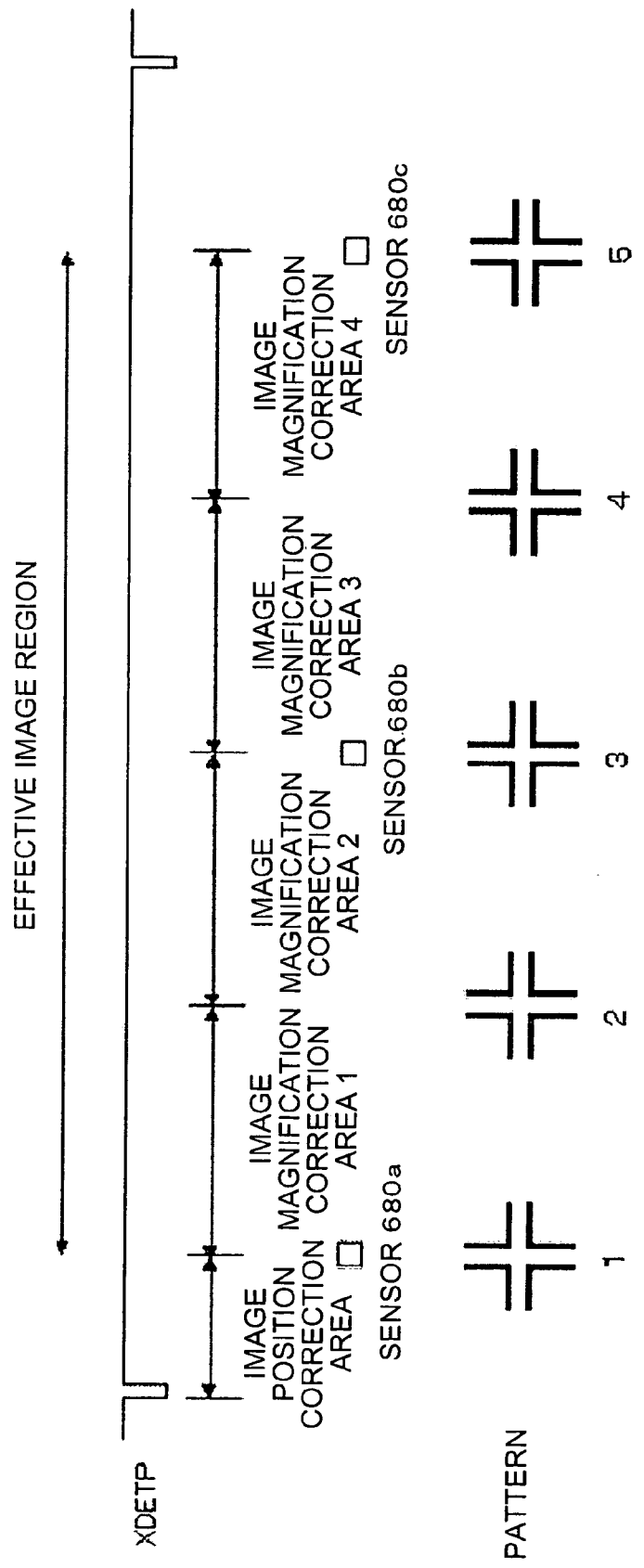
FIG. 27 depicts a relationship among patterns for correction on a recording paper, sensor positions, and areas to be corrected.

FIG. 27 depicts correction patterns on the recording paper 620, sensor positions, and areas to be corrected. The correction patterns on the transfer belt 630 are formed at three positions corresponding to sensors 1, 2, and 3, as explained in the sixth embodiment. Since correction areas are set according to the correction patterns on the recording paper 620, when the magnification is corrected according to the correction patterns on the transfer belt 630, correction data therefor is divided to two correction areas evenly.

For example, correction data calculated from the detection result of the sensor 680a and correction data calculated from the detection result of the sensor 680b are set to a correction area 1 and a correction area 2. When the image position and the image magnification are corrected according to the correction patterns on the recording paper 620 shown in FIG. 26, the detection result of the pattern 1 is reflected on image position correction area, the detection results of the pattern 1 and the pattern 2 are reflected on the correction area 1, the detection results of the pattern 2 and the pattern 3 are reflected on the correction area 2, the detection results of the pattern 3 and the pattern 4 are reflected on the correction area 3, and the detection results of the pattern 4 and the pattern 5 are reflected on the correction area 4.

Regarding a flow for an image position deviation correction, correction based on the patterns on the transfer belt 630 is performed similarly to the correcting procedure shown in FIG. 20 according to the sixth embodiment.

Figure 28:
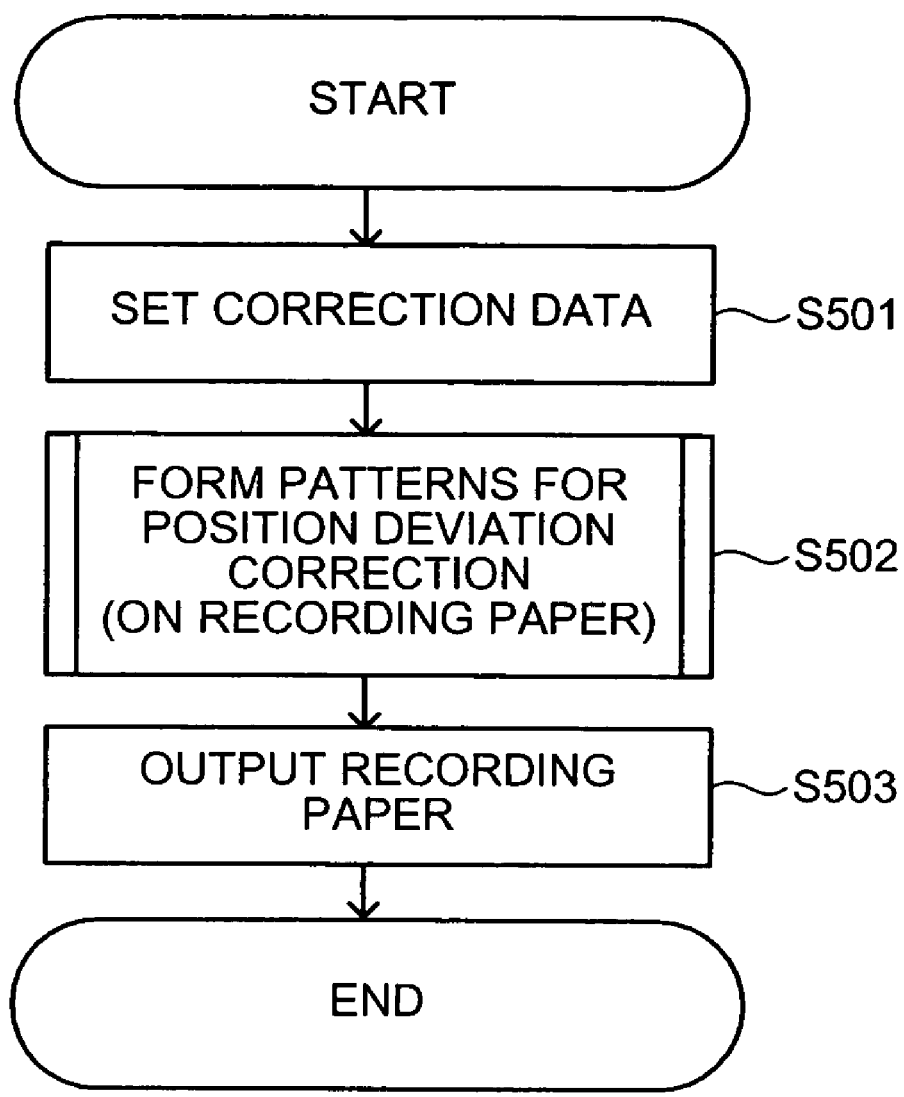
FIG. 28 is a flowchart of a correcting procedure based on the patterns on the recording paper shown in FIG. 26.

Correction based on the patterns on the recording paper 620 shown in FIG. 26 is performed according to a procedure shown in FIG. 28.

In FIG. 28, correction data stored in the correction data storage unit 659 is first set in respective controllers (step S501). This data is the previous correction data, or initial values (preset default values) when correction has not been conducted yet. After the setting, patterns for position deviation correction are formed on the recording paper 620 (step S502), and the recording paper is discharged like an ordinary recording paper with an image (step S503).

Figure 29:
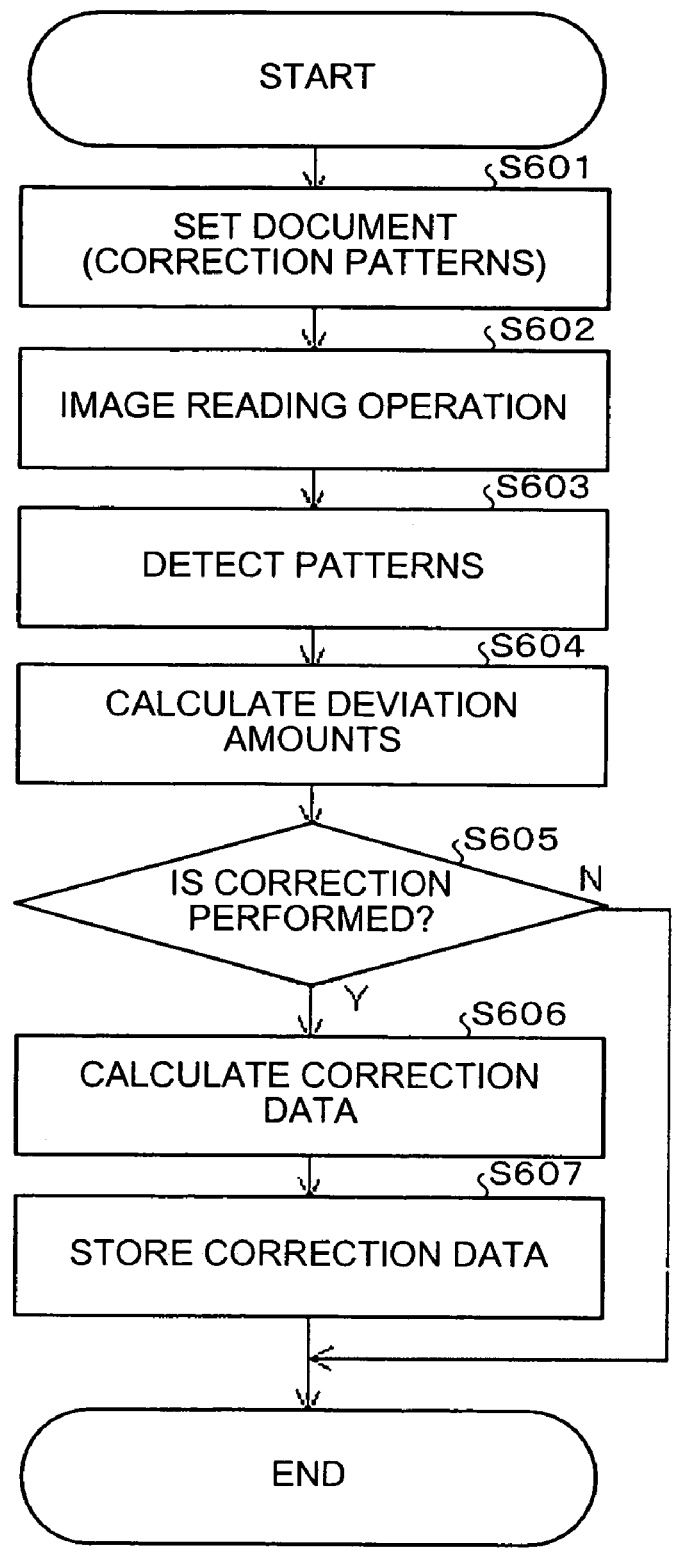
FIG. 29 is a flowchart of a procedure for generating correction data from an image recorded and output according to the procedure shown in FIG. 28.

FIG. 29 depicts a procedure for generating correction data from an image on the recording paper discharged according to the procedure shown in FIG. 28.

In FIG. 29, the output image (patterns for position deviation correction) is set in the image reader 508 (step S601), and reading operation is started (step S602). The patters are detected by the CCD 801 (step S603), deviation amounts of respective colors to black are calculated, and whether correction should be conducted is determined (step S605). It is determined to perform correction when the deviation amount is a half of the correction resolution or more. When correction is performed (determination step S605: Yes), correction data is calculated (step S606), and the correction data is stored (step S607). In the case, only correction data according to the correction operation (the procedure shown in FIG. 29) is updated, and the correction data (the correction procedure shown in FIG. 20) according to the patterns on the transfer belt 630 remains as it is. When correction is not performed, the correction data is not updated.

When the image forming operation and the operation for image position deviation correction based on the recording paper 620 (the procedure shown in FIG. 29) are performed, two kinds of correction data stored in the correction data storage unit 659 are added to each other and the added data is set in respective controllers, thereby forming an image.

The correction operation shown in FIG. 20 is automatically performed at some intervals, however, the correction operation shown in FIG. 29 is performed according to an instruction from an external inputting device, for example, the operation display unit 507 (output of the correction pattern according to the procedure shown in FIG. 28 and execution of the correction operation according to the procedure shown in FIG. 29). Since the correction operation shown in FIG. 29 requires a manual operation which is troublesome for a user, it can be performed only at a time of factory shipment or it can be set to be performed only in a special mode for a maintenance operator.

In the embodiment, when the number of the patterns shown in FIG. 27 is increased, the number of areas and the boundaries are changed accordingly.

A ninth embodiment of the present invention will be explained. The ninth embodiment is a modification of the eighth embodiment next.

Figure 30:
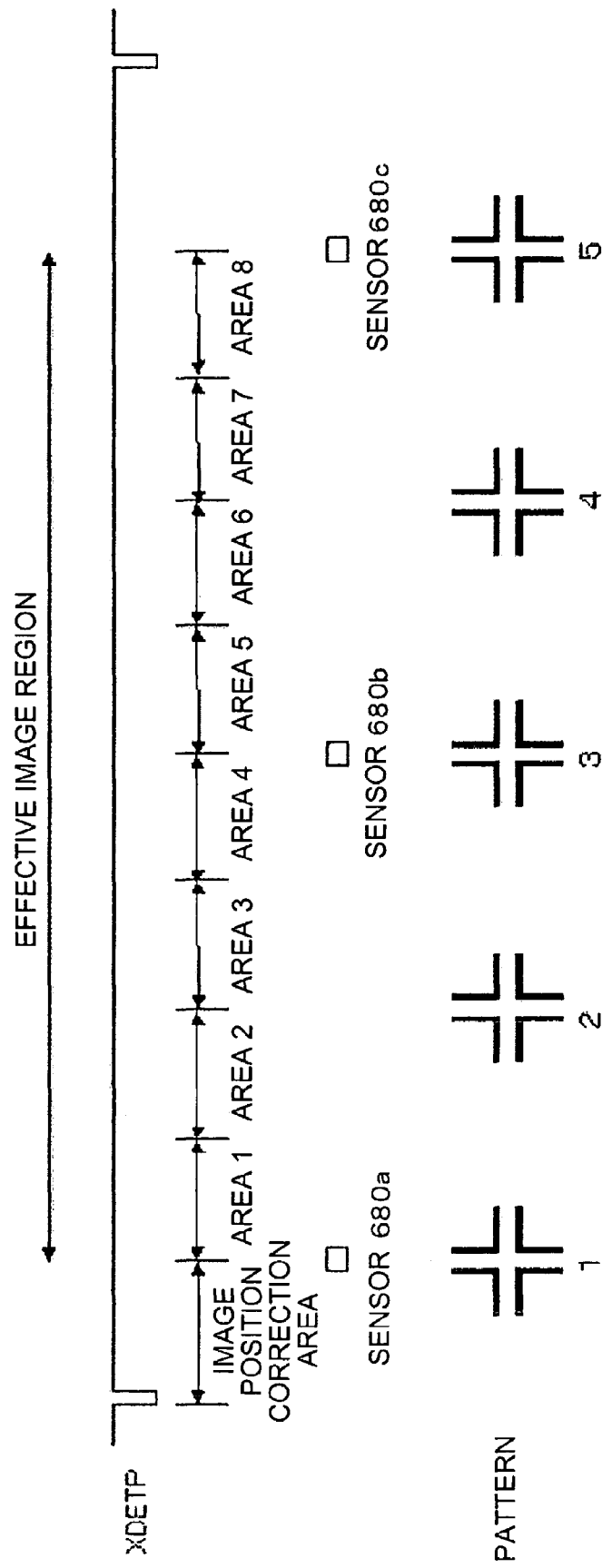
FIG. 30 depicts a relationship among patterns for correction on a recording paper, sensor positions, and areas to be corrected according to a ninth embodiment of the present invention.

FIG. 30 depicts a relationship among correction patterns formed on the recording paper 620, the sensor positions, and the areas to be corrected according to the embodiment.

The ninth embodiment is different to the eighth embodiment in that area boundaries are provided between patterns on the recording paper 620 shown in FIG. 26 and the number of areas is increased.

The correction patterns on the transfer belt 630 are formed at three positions corresponding to the sensors 680a, 680b, and 680c, as explained in the sixth embodiment. When the magnification correction is performed according to the correction patterns on the transfer belt 630 (FIG. 15), the correction data is divided to four correction areas evenly. When the magnification correction is performed according to the correction pattern on the recording paper 620 (FIG. 26), the correction data is divided to two correction areas evenly.

In the embodiment, when tendencies of magnification errors for respective areas are known in advance, the correction data can be biased by weighting instead of evenly dividing the correction data. For example, when correction corresponding to 10 pixel clocks is conducted on the pattern 1 and the pattern 2, correction corresponding to five pixel clocks is allocated to the area 1 and correction corresponding to the remaining five pixel clocks is allocated to the area 2 according to even division. However, if there is a tendency that the area 1 has a larger magnification error than the area 2, it can be set that correction corresponding to seven pixel clocks is allocated to the area 1, while correction corresponding to the remaining three pixel clocks is allocated to the area 2.

A tenth embodiment of the present invention will be explained next.

Figure 31:
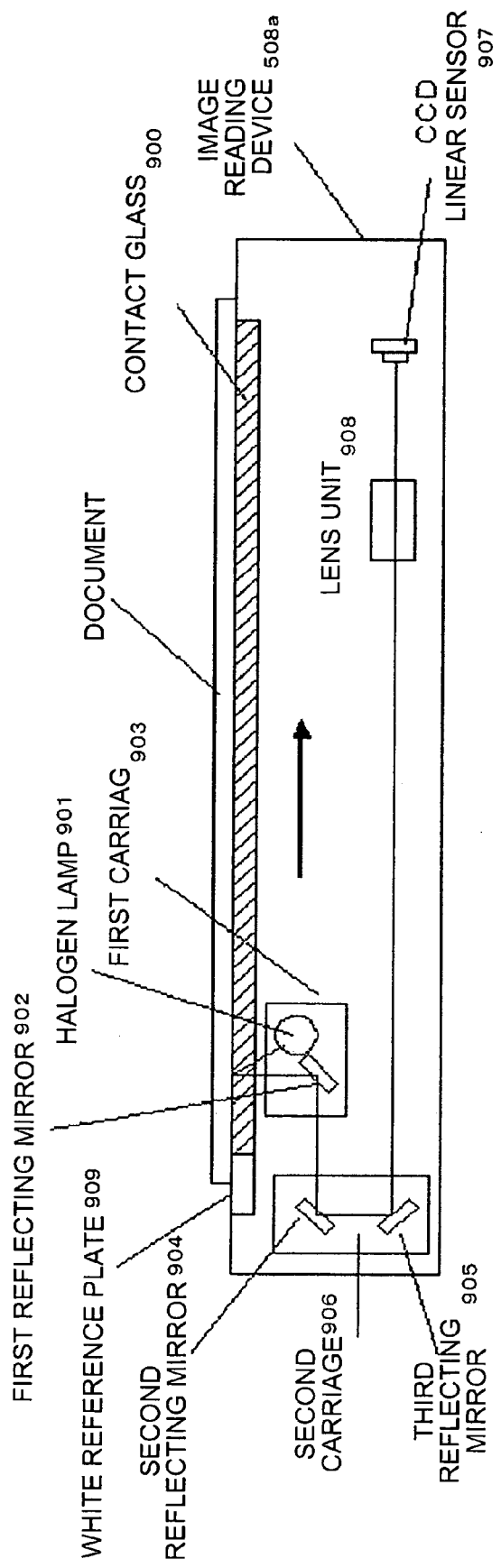
FIG. 31 is a configuration diagram of an image reading device according to a tenth embodiment of the present invention.

FIG. 31 is a configuration diagram of an image reading device 508a according to the tenth embodiment. The image reading device 508a is used when the image forming apparatus 1 does not include the image reader 508.

The image reading device 508a includes a first carriage 903 having a contact glass 900 on which a document is put, a halogen lamp 901 for document exposure, and a first reflecting mirror 902, a second carriage 906 having a second reflecting mirror 904 and a third reflecting mirror 905, a lens unit 908 that images a light on a CCD linear sensor 907, and a white reference plate 909 for obtaining white reference image data for correcting various distortions due to a reading optical system or the like. The first carriage 903 and the second carriage 906 are moved in a direction of arrow by a stepping motor (not shown) at a scanning time (at a time of document reading).

The tenth embodiment is the same as the eighth embodiment except that the tenth embodiment does not include a reader in the image forming apparatus. When the present embodiment is applied to a printer apparatus, since it does not include the image reader 508, the image reading device 508a shown in FIG. 31 is prepared separately to perform correction.

Figure 32:
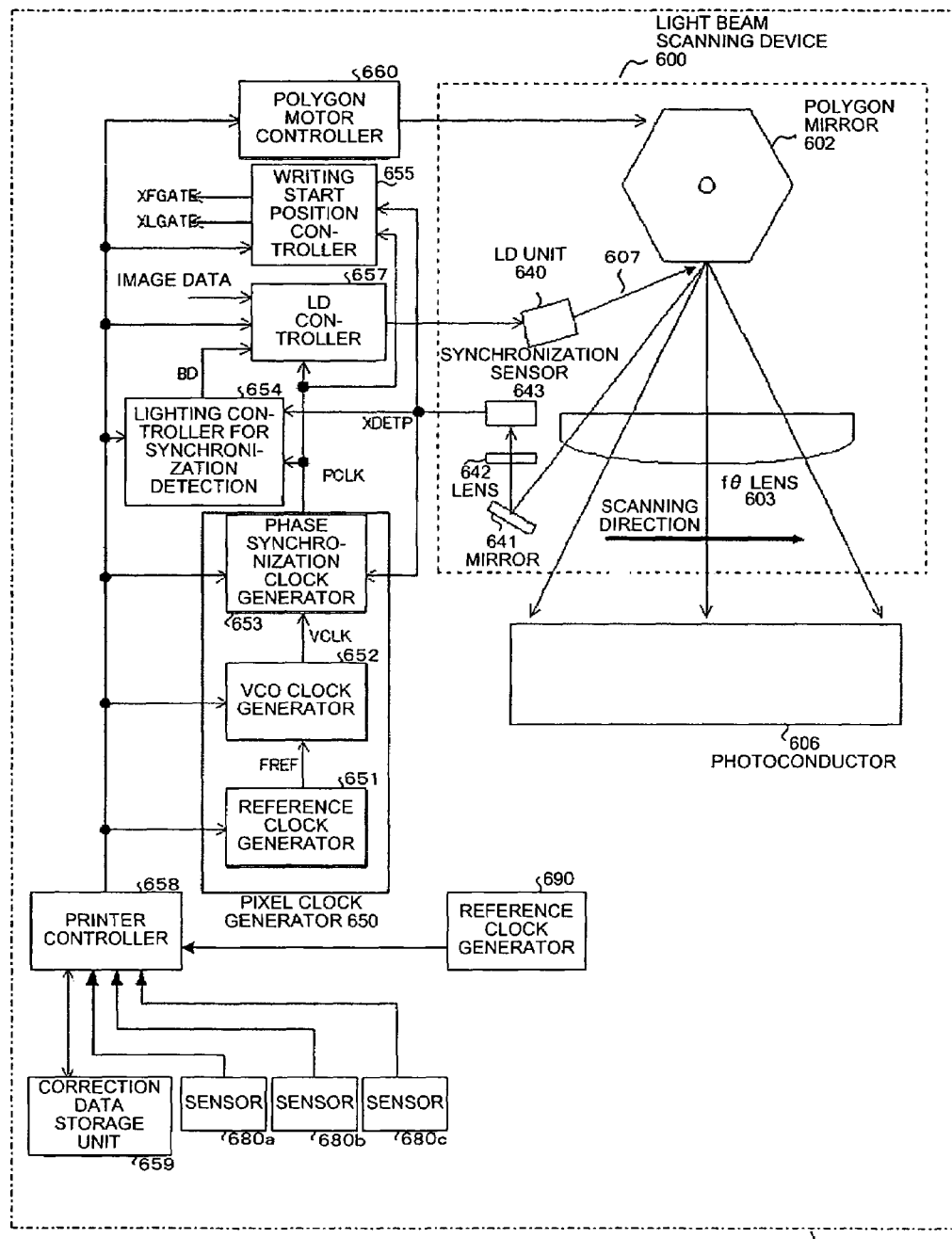
FIG. 32 is a configuration diagram of an image forming unit according to the tenth embodiment.

In the embodiment (the tenth embodiment), unless the image forming apparatus 1 and the image reading device 508a are connected to each other, transmission and reception of data cannot be performed therebetween. Therefore, the image forming unit 509 is configured as shown in FIG. 32. That is, a correction data input unit (I/F unit) 690 that takes in correction data is added to the image forming unit 509 shown in FIG. 16. The image reading device 508a and the correction data input unit 690 are connected to each other so that the printer controller 658 takes in read pattern image data from the image reading device 508a for correction data calculation. Regarding taking-in of the correction data, calculated correction data can be input from an operation panel or the like without connecting the image forming apparatus 1 with the image reading device 508a, so that the entire configuration of the image forming apparatus 1 can be simplified.

Correction operation according to the tenth embodiment using the image reading device 508a can be performed at a time of factory shipment. Such a correction operation is useful especially when the image forming apparatus 1 is a printer apparatus, (because the printer apparatus does not include a scanner device (image reader), which is different from a copying machine or a facsimile apparatus).

Although the exemplary embodiments for implementing the present invention have been described above, the invention is not limited to the embodiments, and various modifications can be made without departing from the scope of the invention.

According to the present invention, since the respective light detectors are arranged such that boundaries for the respective areas correspond to arrangement positions of the light detectors, correction accuracy for image position error and image magnification errors can be improved.

According to the present invention, correction accuracy for color registration deviation and image magnification error can be improved.

According to the present invention, since respective sensors constituting the image position detector are arranged such that boundaries for the respective areas correspond to arrangement positions of the sensors, correction accuracy for image position error and image magnification error can be improved.

According to the present invention, since respective sensors constituting the image position detector are arranged such that boundaries for the respective areas correspond to arrangement positions of the sensors, correction accuracy for color registration deviation error and image magnification error can be improved.

According to the present invention, correction accuracy of color registration deviation, image position error, and image magnification error can be improved and application to various devices becomes possible.

According to the present invention, correction accuracy of color registration deviation, image position error, and image magnification error can be always kept high.

According to the present invention, the image forming apparatus can be realized by using common patterns without adopting a complicated control.

According to the present invention, correction accuracy of color registration deviation, image position error, and image magnification error can be always kept high. Replacement of the light beam scanning device can be detected by detecting the status of a switch whose status changes at the replacement time or by detecting operation input for notifying that the switch has been replaced.

According to the present invention, correction accuracy of color registration deviation, image position error, and image magnification error can be always kept high. Replacement of the constituent part in the light beam scanning device can be detected by detecting the status of a switch whose status changes at the replacement time or by detecting operation input for notifying that the constituent part has been replaced.

According to the present invention, correction accuracy of color registration deviation, image position error, and image magnification error can be always kept high. Replacement of the image position detector can be detected by detecting the status a switch whose status changes at the replacement time or by detecting operation input for notifying that the image position detector has been replaced.

According to the present invention, since the light detector is stably arranged in the light beam scanning device, correction accuracy of color registration deviation, image position error, and image magnification error can be always kept high.

According to the present invention, since the patterns for image position deviation correction are formed at positions where formation positions of the patterns for image position deviation correction in the main scanning direction correspond to boundaries for the respective areas, correction accuracy for image position error and image magnification error can be improved.

According to the present invention, image position error and image magnification error can be reliably corrected in an actual image.

According to the present invention, since the image reading device originally included in the image forming apparatus is utilized as the image position deviation detector, the present invention can be realized at a low cost.

According to the present invention, the invention can be applied even if the number of boundaries for the areas is more than the number of the patterns for image position deviation correction in the main scanning direction.

According to the present invention, a partial magnification error in the main scanning direction can be reduced as much as possible.

According to the present invention, since a plurality of detection results in the sub-scanning direction can be averaged, influence of detection fluctuation can be reduced as much as possible.

According to the present invention, an image position error and an image magnification error in the effective image region can be corrected reliably.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image forming apparatus, comprising:
  a light source configured to emit a light beam in a main scanning direction according to image data for forming an image;
  a control unit configured to control the light source by variably controlling a cycle of a pixel clock for each pixel in the main scanning direction;
  a plurality of detectors configured to detect the light beam emitted from the light source in the main scanning direction;

a correcting unit configured to correct an image position and image magnification in the main scanning direction by changing the cycle of the pixel clock for each pixel based on detection results of each of the detectors, wherein the correcting unit is configured to correct the image position and the image magnification in the main scanning direction by dividing the main scanning direction into a plurality of areas based on a position of each of the detectors, and changing the cycle of the pixel clock for each pixel in each of the areas independently, and the detectors are arranged at positions corresponding to boundaries between the areas in the main scanning direction;

a unit configured to change a number of the areas;

an area setting changing unit configured to change positions of the boundaries based on the detection results of the detectors; and a light beam scanning device, wherein the area setting changing unit is configured to change a setting of the areas when the light beam scanning device is replaced.

2. The image forming apparatus according to claim 1, wherein the image forming apparatus is a color image forming apparatus and includes for each color the light source;
the control unit;
the detectors; and
the correcting unit.

3. The image forming apparatus according to claim 1, further comprising a light beam detector, wherein the area setting changing unit is configured to change a setting of the areas when the light beam detector is replaced.

4. The image forming apparatus according to claim 1, wherein the area setting changing unit is configured to change a setting of the areas when power is supplied to the image forming apparatus.

5. The image forming apparatus according to claim 1, wherein the area setting changing unit is configured to change a setting of the areas for each of the cycles set.

6. The image forming apparatus according to claim 1, wherein the detectors and the light source are arranged in the light beam scanning device.

7. The image forming apparatus according to claim 1, wherein the correcting unit is configured to divide the main scanning direction into an image position correction area and an image magnification correction area.

8. An image forming apparatus, comprising:

a light source configured to emit a light beam in a main scanning direction according to image data for forming an image;

a control unit configured to control the light source by variably controlling a cycle of a pixel clock for each pixel in the main scanning direction;

a plurality of detectors configured to detect the light beam emitted from the light source in the main scanning direction;

a correcting unit configured to correct an image position and image magnification in the main scanning direction by changing the cycle of the pixel clock for each pixel based on detection results of each of the detectors, wherein the correcting unit is configured to correct the image position and the image magnification in the main scanning direction by dividing the main scanning direction into a plurality of areas based on a position of each of the detectors, and changing the cycle of the pixel clock for each pixel in each of the areas independently, and the detectors are arranged at positions corresponding to boundaries between the areas in the main scanning direction;

a unit configured to change a number of the areas;

an area setting changing unit configured to change positions of the boundaries based on the detection results of the detectors; and a light beam scanning device, wherein the area setting changing unit is configured to change a setting of the areas when a component of the light beam scanning device is replaced.

9. The image forming apparatus according to claim 8, wherein the image forming apparatus is a color image forming apparatus and includes for each color the light source;
the control unit;
the detectors; and
the correcting unit.

10. The image forming apparatus according to claim 8, further comprising a light beam detector, wherein the area setting changing unit is configured to change a setting of the areas when the light beam detector is replaced.

11. The image forming apparatus according to claim 8, wherein the area setting changing unit is configured to change a setting of the areas when power is supplied to the image forming apparatus.

12. The image forming apparatus according to claim 8, wherein the area setting changing unit is configured to change a setting of the areas for each of the cycles set.

13. The image forming apparatus according to claim 8, wherein the detectors and the light source are arranged in the light beam scanning device.

14. The image forming apparatus according to claim 8, wherein the correcting unit is configured to divide the main scanning direction into an image position correction area and an image magnification correction area.

15. An image forming apparatus, comprising:

a light source configured to emit a light beam in a main scanning direction according to image data for forming an image;

a control unit configured to control the light source by variably controlling a cycle of a pixel clock for each pixel in the main scanning direction;

a plurality of detectors configured to detect the light beam emitted from the light source in the main scanning direction;

a correcting unit configured to correct an image position and image magnification in the main scanning direction by changing the cycle of the pixel clock for each pixel based on detection results of each of the detectors, wherein the correcting unit is configured to correct the image position and the image magnification in the main scanning direction by dividing the main scanning direction into a plurality of areas based on a position of each of the detectors, and changing the cycle of the pixel clock for each pixel in each of the areas independently, and the detectors are arranged at positions corresponding to boundaries between the areas in the main scanning direction;

a unit configured to change a number of the areas;

an area setting changing unit configured to change positions of the boundaries based on the detection results of the detectors, wherein the area setting changing unit is configured to change a setting of the areas when any one of the detectors is replaced.

16. The image forming apparatus according to claim 15, wherein the image forming apparatus is a color image forming apparatus and includes for each color the light source;

the control unit;

the detectors; and the correcting unit.

17. The image forming apparatus according to claim 15, further comprising a light beam detector, wherein the area setting changing unit is configured to change a setting of the areas when the light beam detector is replaced.

18. The image forming apparatus according to claim 15, wherein the area setting changing unit is configured to change a setting of the areas when power is supplied to the image forming apparatus.

19. The image forming apparatus according to claim 15, wherein the area setting changing unit is configured to change a setting of the areas for each of the cycles set.

20. The image forming apparatus according to claim 15, further comprising a light beam scanning device, wherein the detectors and the light source are arranged in the light beam scanning device.

21. The image forming apparatus according to claim 15, wherein the correcting unit is configured to divide the main scanning direction into an image position correction area and an image magnification correction area.

* * * * *